(12) United States Patent
Muta et al.

(10) Patent No.: US 11,334,151 B2
(45) Date of Patent: May 17, 2022

(54) DISPLAY APPARATUS, DISPLAY METHOD, PROGRAM, AND NON-TRANSITORY COMPUTER-READABLE INFORMATION RECORDING MEDIUM

(71) Applicant: Rakuten Group, Inc., Tokyo (JP)

(72) Inventors: Masafumi Muta, Tokyo (JP); Keigo Matsumoto, Tokyo (JP); Kelvin Ka Sin Cheng, Tokyo (JP); Soh Masuko, Tokyo (JP)

(73) Assignee: Rakuten Group, Inc., Tokyo (JP)

(*) Notice: Subject to any disclaimer, the term of this patent is extended or adjusted under 35 U.S.C. 154(b) by 404 days.

(21) Appl. No.: 16/483,305

(22) PCT Filed: May 21, 2018

(86) PCT No.: PCT/JP2018/019457
§ 371 (c)(1),
(2) Date: Aug. 2, 2019

(87) PCT Pub. No.: WO2019/224866
PCT Pub. Date: Nov. 28, 2019

(65) Prior Publication Data
US 2021/0357023 A1  Nov. 18, 2021

(51) Int. Cl.
*G06F 3/01* (2006.01)
*G06T 11/00* (2006.01)

(52) U.S. Cl.
CPC .............. *G06F 3/013* (2013.01); *G06T 11/00* (2013.01)

(58) Field of Classification Search
CPC .................................. G06F 3/013; G06T 11/00
See application file for complete search history.

(56) References Cited

U.S. PATENT DOCUMENTS 10,859,829 B2 * 12/2020 Bakos .................... G06F 3/011
2020/0341274 A1 * 10/2020 Onuki ................ G02B 27/0172

OTHER PUBLICATIONS

Paivi Majaranta et al., "Fast Gaze Typing with an Adjustable Dwell Time," In Proceedings of the SIGCHI Conference on Human Factors in Computing Systems (2009), ACM, pp. 357-360.
Abir Al Hajri et al., "Moving Target Selection in 2D Graphical User Interfaces," In IFIP Conference on Human-Computer Interaction (2011), Springer, pp. 141-161.

* cited by examiner

*Primary Examiner* — Chong Wu
(74) *Attorney, Agent, or Firm* — Sughrue Mion, PLLC

(57) ABSTRACT

An estimator (111) estimates whether an object is on the line of sight of the user. When a first object is estimated as being on the line of sight of the user continuously for a first threshold time, set for the user, or longer, a displayer (112) displays a second object in the field of view of the user. The second object expresses information about the first object. When the second object is estimated as not being on the line of sight of the user continuously for a second threshold time, set for the user, or longer, a remover (113) removes the second object from the field of view of the user. A corrector (114) corrects the first threshold time according to the length of viewing time that the second object is estimated as being on the line of sight of the user. Here, the first threshold time is set for the user.

14 Claims, 23 Drawing Sheets

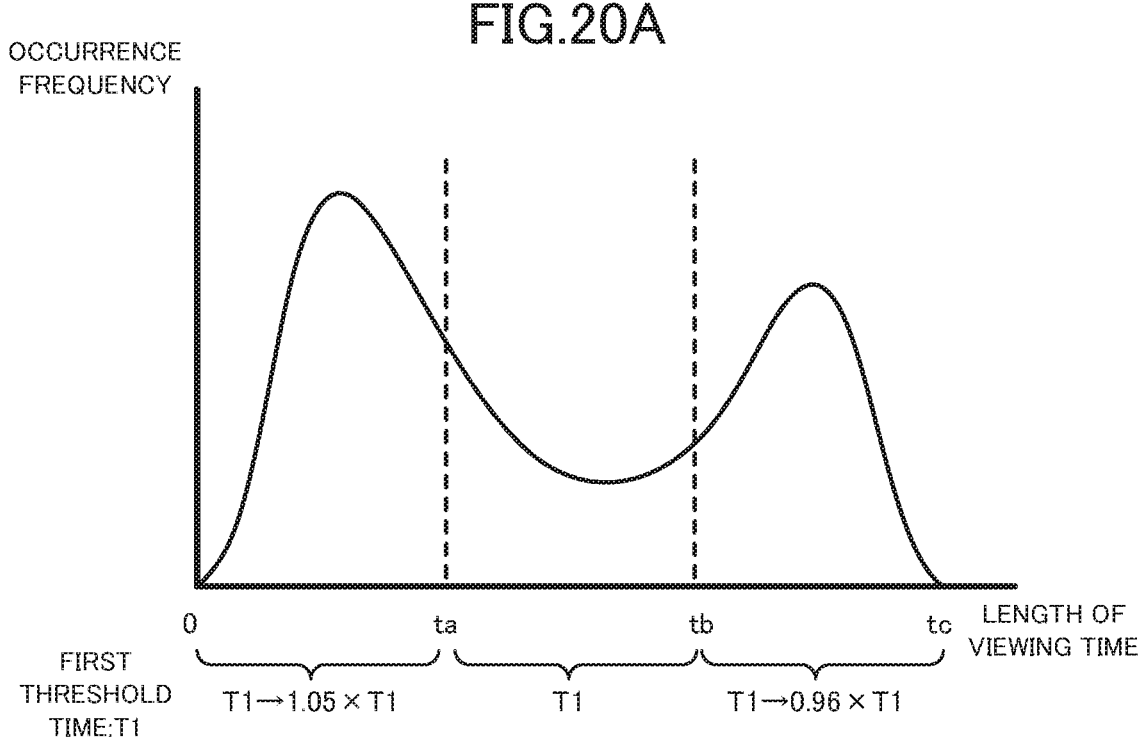
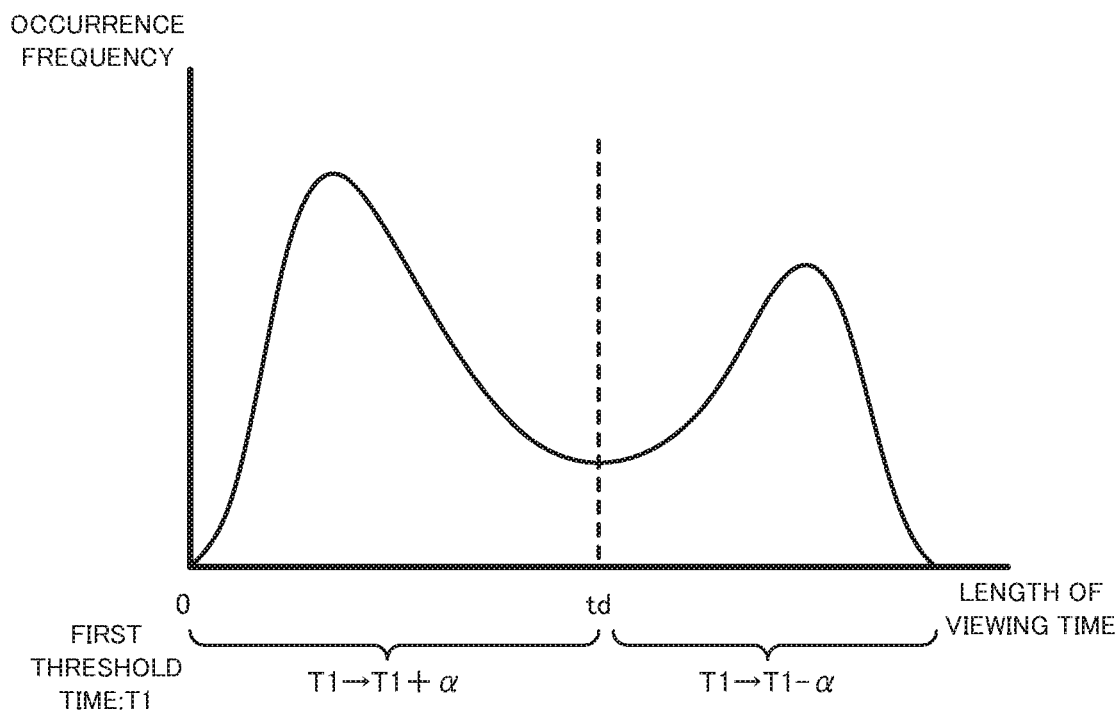

DISPLAY APPARATUS, DISPLAY METHOD, PROGRAM, AND NON-TRANSITORY COMPUTER-READABLE INFORMATION RECORDING MEDIUM

CROSS REFERENCE TO RELATED APPLICATIONS

This application is a National Stage of International Application No. PCT/JP2018/019457 filed May 21, 2018.

TECHNICAL FIELD

The present disclosure relates generally to a display apparatus, a display method, a program, and a non-transitory computer-readable information recording medium.

BACKGROUND ART

In the related art, there is a method for selecting a target displayed on a head-mounted display. This method includes detecting the gaze direction of a user from the orientation of the head of the user, and selecting a target when the target in the gaze direction is present for a predetermined amount of time, that is, when the user gazes at the target for a predetermined amount of time (Non-Patent Literature 1). However, in cases in which the target or the user is moving, the user has to move their head in accordance with the movement of the target in order to continuously gaze at the target for the predetermined amount of time. Consequently, selecting the target using this method is difficult. There is also a method for selecting a moving target in a 2D display. This method includes temporarily stopping the target when the user clicks a button of a mouse (Non-Patent Literature 2).

CITATION LIST

Non Patent Literature

Non-Patent Literature 1: MAJARANTA P., AHOLA U.-K., SPAKOV O.: Fast gaze typing with an adjustable dwell time. In Proceedings of the SIGCHI Conference on Human Factors in Computing Systems (2009), ACM, pp. 357-360.
Non-Patent Literature 2: AL HAJRI A., FELS S., MILLER G., ILICH M.: Moving target selection in 2d graphical user interfaces. In IFIP Conference on Human-Computer Interaction (2011), Springer, pp. 141-161.

SUMMARY OF INVENTION

Technical Problem

In Non-Patent Literature 2, the user is stationary, but when the user is wearing a head-mounted display in an augmented reality system, the user may be moving. As such, a technique is needed for efficiently selecting the target when both the user and the target are moving. In particular, when an object that is on the line of sight of the user is selected, from among a plurality of objects moving on a display, as an object on which the user is focused on, it must be determined if the object on the line of sight of the user is an object that the user is intentionally focused on or is an object that has coincidentally passed through the line of sight of the user.

To solve such a problem, an objective of the present disclosure is to provide a display apparatus, a display method, a program, and a non-transitory computer-readable information recording medium that are capable of appropriately determining if an object on the line of sight of the user is an object that the user is intentionally focused on or is an object that has coincidentally passed through the line of sight of the user.

Solution to Problem

A display apparatus according to a first aspect of the present disclosure includes: an estimator that estimates whether an object is on a line of sight of a user; a display device that displays a second object in a field of view of the user when a first object is estimated as being on the line of sight of the user continuously for a first threshold time, set for the user, or longer, the second object expressing information about the first object; a remover that removes the second object from the field of view of the user when the second object is estimated as not being on the line of sight of the user continuously for a second threshold time, set for the user, or longer; and a corrector that corrects the first threshold time, set for the user, in accordance with a length of viewing time that the second object is estimated as being on the line of sight of the user.

In the display apparatus according to the aspect described above, the corrector may perform a correction to lengthen the first threshold time more as the length of viewing time becomes shorter.

In the display apparatus according to the aspect described above, the corrector may correct the first threshold time on the basis of a distribution of the length of viewing time.

In the display apparatus according to the aspect described above, the display device may remove a third object that is associated with the first object from the field of view of the user and display the second object in the field of view of the user when the first object is estimated as being on the line of sight of the user continuously for a third threshold time, set for the user, or longer, the third threshold time being shorter than the first threshold time, remove the third object from the field of view of the user and display the second object in the field of view of the user when the third object is estimated as being on the line of sight of the user continuously for the first threshold time or longer, and remove the third object from the line of sight of the user when the third object is estimated as not being on the line of sight of the user continuously for the first threshold time or longer.

In the display apparatus according to the aspect described above, the display device may display the third object so as to appear at a same position as the first object.

In the display apparatus according to the aspect described above, after the third object appears, the display device may display the third object so as to remain at a position in space in which the first object is disposed.

In the display apparatus according to the aspect described above, after the third object appears, the display device may display the third object such that the third object moves so as to follow a movement trajectory of the first object, and a movement speed of the third object gradually decreases.

In the display apparatus according to the aspect described above, after the third object appears, the display device may display the third object such that the third object follows the first object until the first object leaves the field of view of the user, and remains at an edge of the field of view of the user when the first object leaves the field of view of the user.

In the display apparatus according to the aspect described above, the third threshold time may be calculated on the basis of the first threshold time.

In the display apparatus according to the aspect described above, after the second object is displayed as a result of the third object being estimated as being on the line of sight of the user continuously for the first threshold time or longer, the corrector may correct the third threshold time that is set for the user, in accordance with a length of viewing time that the second object is estimated as being on the line of sight of the user.

In the display apparatus according to the aspect described above, the corrector may perform a correction to lengthen the third threshold time more as the length of viewing time becomes shorter.

In the display apparatus according to the aspect described above, the corrector may correct the third threshold time on the basis of a distribution of the length of viewing time.

A display method according to a second aspect of the present disclosure is a display method to be executed by a display apparatus, the method including:

estimating whether an object is on a line of sight of a user;

displaying a second object in a field of view of the user when a first object is estimated as being on the line of sight of the user continuously for a first threshold time, set for the user, or longer, the second object expressing information about the first object;

removing the second object from the field of view of the user when the second object is estimated as not being on the line of sight of the user continuously for a second threshold time, set for the user, or longer; and correcting the first threshold time, set for the user, in accordance with a length of viewing time that the second object is estimated as being on the line of sight of the user.

A program according to a third aspect of the present disclosure causes a computer to function as:

an estimator that estimates whether an object is on a line of sight of a user;

a display device that displays a second object in a field of view of the user when a first object is estimated as being on the line of sight of the user continuously for a first threshold time, set for the user, or longer, the second object expressing information about the first object;

a remover that removes the second object from the field of view of the user when the second object is estimated as not being on the line of sight of the user continuously for a second threshold time, set for the user, or longer; and a corrector that corrects the first threshold time, set for the user, in accordance with a length of viewing time that the second object is estimated as being on the line of sight of the user.

A non-transitory computer-readable information recording medium according to a fourth aspect of the present disclosure is caused to function as:

an estimator that estimates whether an object is on a line of sight of a user;

a display device that displays a second object in a field of view of the user when a first object is estimated as being on the line of sight of the user continuously for a first threshold time, set for the user, or longer, the second object expressing information about the first object;

a remover that removes the second object from the field of view of the user when the second object is estimated as not being on the line of sight of the user continuously for a second threshold time, set for the user, or longer; and a corrector that corrects the first threshold time, set for the user, in accordance with a length of viewing time that the second object is estimated to be on the line of sight of the user.

The information recording medium can be distributed and sold independent from computers. Here, the term "non-transitory information recording medium" refers to a tangible information recording medium. Examples of the non-transitory information recording medium include compact disks, flexible disks, hard disks, magnetic disks, digital video disks, magnetic tape, and semiconductor memory. The term "transitory information recording medium" means the transmission medium (the propagation signal) itself. Examples of transitory recording media include electronic signals, optical signals, and electromagnetic waves. Additionally, the term "temporary storage space" refers to space for temporarily storing data, programs, and the like. Examples of temporary storage space include volatile memory such as random access memory (RAM).

Advantageous Effects of Invention

According to the present disclosure, it is possible to appropriately determine if an object on the line of sight of the user is an object that the user is intentionally focused on or is an object that has coincidentally passed through the line of sight of the user.

BRIEF DESCRIPTION OF DRAWINGS

FIG. 20A is a drawing for explaining an example of correcting a first threshold time in accordance with a length of viewing time;

FIG. 20B is a drawing for explaining an example of correcting the first threshold time in accordance with the length of viewing time;

DESCRIPTION OF EMBODIMENTS

Figure 1:
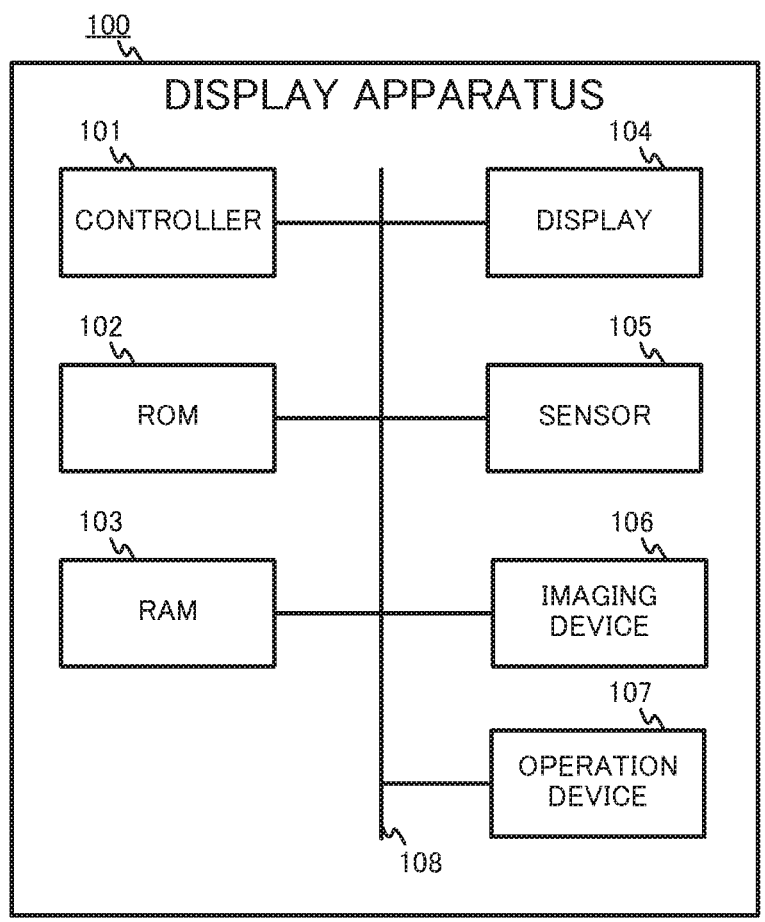
FIG. 1 is a schematic block diagram illustrating the hardware configuration of a display apparatus according to Embodiment 1.

Hereinafter, embodiments of the present disclosure are described.

However, the following embodiments are presented for the purpose of explanation and should not be construed as limiting the scope of the invention of the present disclosure. Therefore, embodiments in which some elements or all elements of these embodiments are replaced with equivalent elements by one skilled in the art can also be employed, and such embodiments are also included within the scope of the present disclosure. Note that, when describing the embodiments of the present disclosure while referencing the drawings, identical or corresponding components are marked with the same reference numerals.

Embodiment 1

FIG. 1 is a schematic block diagram illustrating the hardware configuration of a display apparatus 100 according to the present embodiment. In one example, the display apparatus 100 is implemented as a head-mounted display that includes various sensors and a control device. The head-mounted display may be constructed by mounting a smartphone, tablet computer, phablet, or similar portable computer on an attachment. In this case, the display apparatus 100 is realized by causing a portable computer to execute a program that causes the portable computer to function as the components described above. As illustrated in FIG. 1, the display apparatus 100 includes a controller 101, read-only memory (ROM) 102, RAM 103, a display 104, a sensor section 105, an imaging device 106, and an operation device 107. The various components are connected via a bus 108.

In one example, the controller 101 is implemented as a central processing unit (CPU). The controller 101 controls the entire display apparatus 100.

The ROM 102 is nonvolatile memory that stores programs and various types of data that the controller 101 uses to control the entire display apparatus 100.

The RAM 103 is volatile memory for temporarily storing information generated by the controller 101 and data needed to generate that information.

The display 104 includes a liquid crystal display (LCD), a backlight, and the like. Under the control of the controller 101, the display 104 displays images output from the controller 101, for example.

The sensor section 105 includes an attitude sensor, an acceleration sensor, and the like. The sensor section 105 detects the orientation of the display apparatus 100.

The imaging device 106 includes an image sensor such as a charge coupled device (CCD) or a complementary metal-oxide-semiconductor (CMOS). The imaging device 106 captures the state in front of the display apparatus 100, that is, the state of the gaze direction of the user.

The operation device 107 is constituted by an input device such as a button, a keyboard, a touch panel, or the like. The operation device 107 receives operation inputs from the user of the display apparatus 100 and outputs, to the controller 101, signals corresponding to the received operation inputs.

Next, the positional relationships between the display apparatus 100 and the user, and the first object in real space in the present embodiment are described. In the present embodiment, the display apparatus 100 is a head-mounted display that is configured such that the user can simultaneously view real space and an image displayed on the display 104. In one example, this configuration is realized by using a transmissive display as the display 104. The display 104 may also be realized by image projection on a transmissive film or image projection on the retina of the user. A configuration is also possible in which the display apparatus 100 includes opaque liquid crystal as the display 104, and an image of real space captured by the imaging device 106 is combined with an image of an object in virtual space and displayed on the opaque liquid crystal.

Figure 2A:
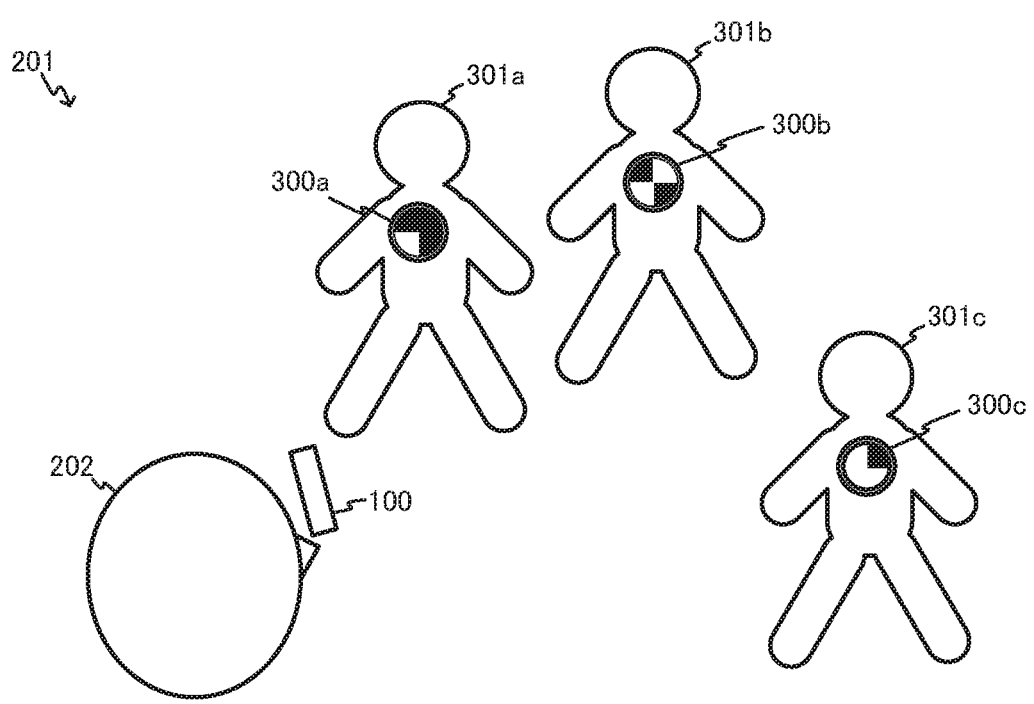
FIG. 2A is a bird's eye view illustrating the states of a user wearing the display apparatus and first objects in real space.
Figure 2B:
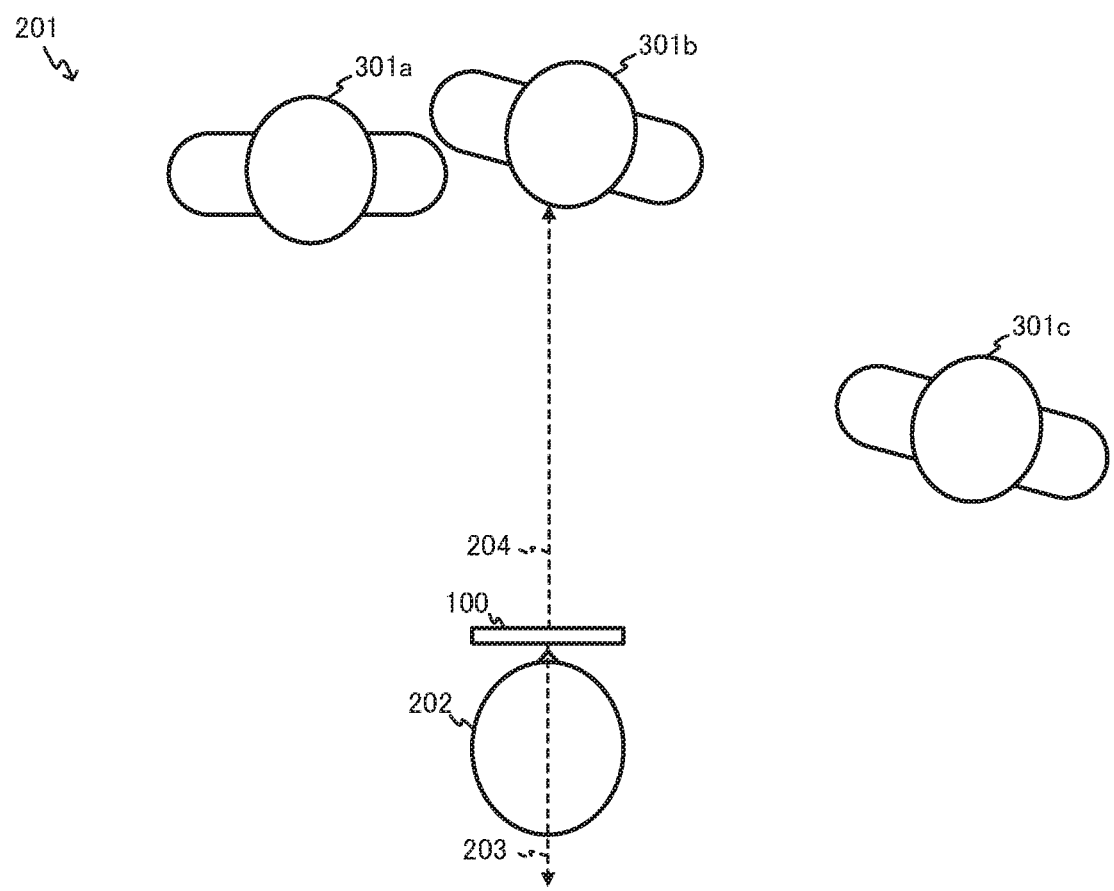
FIG. 2B is a top view illustrating the states of the user wearing the display apparatus and the first objects in the real space.

FIG. 2A is a bird's eye view illustrating the states of a user 202 wearing the display apparatus 100 and first objects 300a to 300c in real space 201. FIG. 2B is a top view illustrating the states of the user 202 wearing the display apparatus 100 and the first objects 300a to 300c in the real space 201;

As illustrated in FIGS. 2A and 2B, in the real space 201, the display apparatus 100 is worn over the eyes of the user 202. When the user 202 is wearing the display apparatus 100, a display direction 203 of the display apparatus 100 is opposite a gaze direction 204 of the user 202 toward the display apparatus 100.

As illustrated in FIGS. 2A and 2B, a plurality of stationary or moving observation targets 301a to 301c are present in the real space 201. The observation targets 301a to 301c are respectively wearing first objects 300a to 300c. In the present embodiment, the first objects 300a to 300c are AR markers that include predetermined pattern images that are associated with the observation targets 301a to 301c. In one example, the pattern images of the first objects 300a to 300c are stored, in advance, in the ROM 102. By focusing on the first object 300a to 300c of an observation target that of interest to the user 202 among the observation targets 301a to 301c, the user 202 can cause information about the observation target that is focused on (described later) to be displayed on the display 104.

Figure 3:
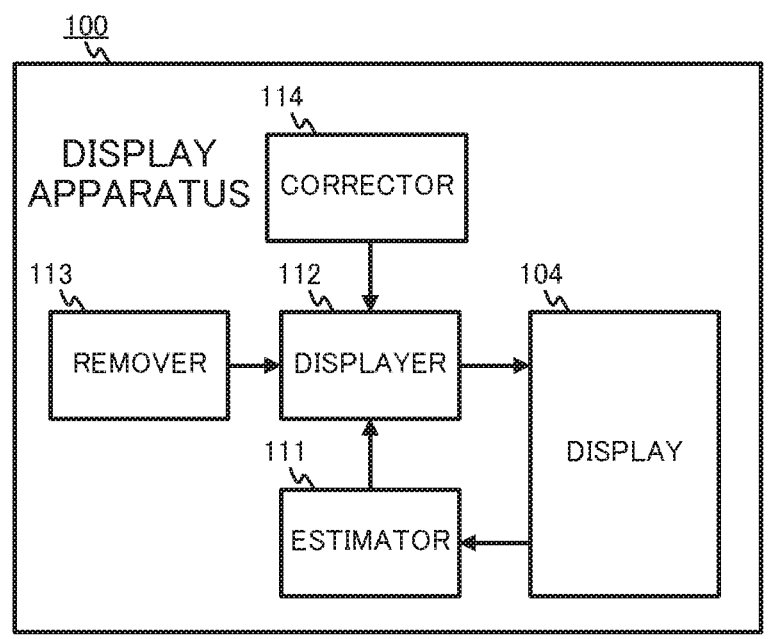
FIG. 3 is a schematic block diagram illustrating the functional configuration of the display apparatus according to Embodiment 1.

FIG. 3 is a schematic block diagram illustrating the functional configuration of the display apparatus 100 according to the present embodiment. As illustrated in FIG. 3, the display apparatus 100 includes an estimator 111, a displayer 112, a remover 113, a corrector 114, and a display 104.

The estimator 111 estimates whether an object is on the line of sight of the user 202. In the present embodiment, the estimator 111 estimates whether the first objects 300a to 300c and a second object 500 (described later) are on the line of sight of the user 202.

First, an example of a method whereby the estimator 111 estimates whether the first objects 300a to 300c are on the line of sight of the user 202 is described. In one example, the estimator 111 captures an image of the gaze direction 204 of the user 202 using the imaging device 106, and identifies a predetermined range of that captured image as a focus area. For example, with the center of the captured image as the gaze direction, a predetermined range from the center is identified as the focus area. Note that the estimator 111 estimates that the first objects 300a to 300c are on the line of sight of the user 202 when the first objects 300a to 300c are present in the focus area of the captured image.

Figure 4:
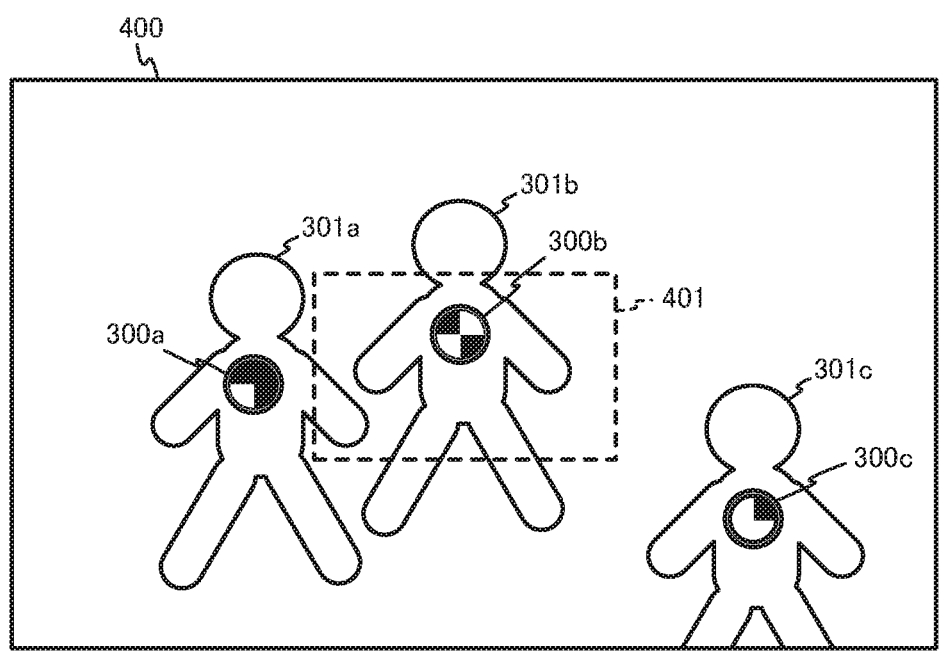
FIG. 4 is a drawing illustrating a captured image, captured by an imaging device, in which the state of the line of sight of the user is captured.

In one example, when the imaging device 106 captures the captured image 400 illustrated by FIG. 4, the estimator 111 identifies a predetermined range from the center of that captured image 400 as a focus area 401. Then, the estimator 111 compares the image in the focus area 401 with pre-stored pattern images of the first objects 300a to 300c, and uses image recognition to determine whether the first objects 300a to 300c are in the focus area 401. As illustrated in FIG. 4, when the estimator 111 determines that the pattern image of the first object 300b is in the focus area 401, the estimator 111 estimates that the first object 300b is on the line of sight of the user 202.

Next, a case is described in which the estimator 111 estimates whether a second object 500 is on the line of sight of the user 202. The estimator 111 identifies a predetermined range of the display 104 as the focus area. For example, a predetermined region from the center of the display 104 is identified as the focus area. Then, the estimator 111 determines whether the second object 500 is displayed in the focus area of the display 104. When the estimator 111 determines that the second object 500 is displayed in the focus area, the estimator 111 estimates that the second object 500 is on the line of sight of the user 202.

Figure 5:
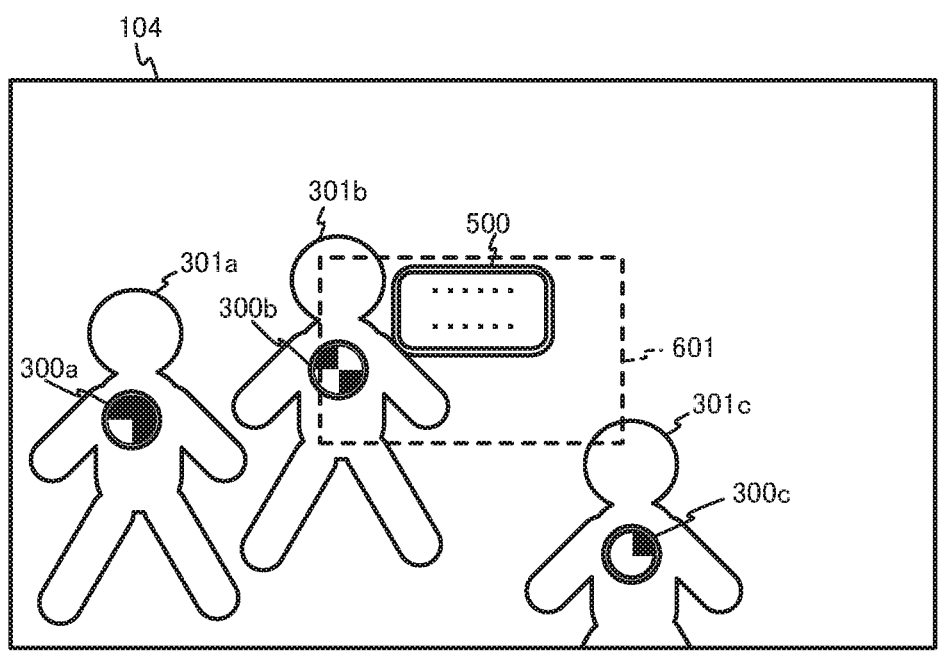
FIG. 5 is a drawing for explaining a display aspect of a second object.

In one example, when display device 112 displays the second object 500 on the display 104 as illustrated in FIG. 5, the estimator 111 identifies a predetermined range from the center of the display 104 as a focus area 601. Then, when the estimator 111 determines that the second object 500 is displayed in the focus area 601, the estimator 111 estimates that the second object 500 is on the line of sight of the user 202. Note that, the estimator 111 determines whether the second object 500 is displayed in the focus area 601 using the position of a representative point (for example, the center point or the center of gravity point) of the second object 500 as the position of the second object 500.

In the present embodiment, the controller 101 and the imaging device 106 cooperate to function as the estimator 111.

When the first objects 300a to 300c are estimated as being on the line of sight of the user 202 continuously for a first threshold time, set for the user 202, or longer, the displayer 112 displays the second object 500 in the field of view of the user 202. The second object 500 expresses information about the first objects 300a to 300c.

Here, the first threshold time is a threshold time for estimating whether the user 202 is focused on the first objects 300a to 300c. The first threshold time is set for each user and is stored, for example, in the RAM 103.

The second object 500 is an object that expresses information about the first objects 300a to 300c. In the present embodiment, the second object 500 expresses information about the observation targets 301a to 301c that are wearing the first objects 300a to 300c that are estimated as being on the line of sight of the user 202 continuously for the first threshold time or longer. The information about the observation targets 301a to 301c may be associated with, for example, marker images of the first objects 300a to 300c and stored, in advance, in the ROM 102, or may be stored in an external storage device.

In one example, when the estimator 111 estimates that the first object 300b is on the line of sight of the user 202, the displayer 112 counts the length of time that the first object 300b is continuously on the line of sight of the user 202 (length of time on line of sight). Moreover, when it is determined that the counted length of time on line of sight is greater than or equal to the first threshold time, the displayer 112 acquires, from the ROM 102, the information about the observation target 301b associated with the first object 300b, and displays the second object 500 that expresses the acquired information in the field of view of the user 202.

Figure 6:
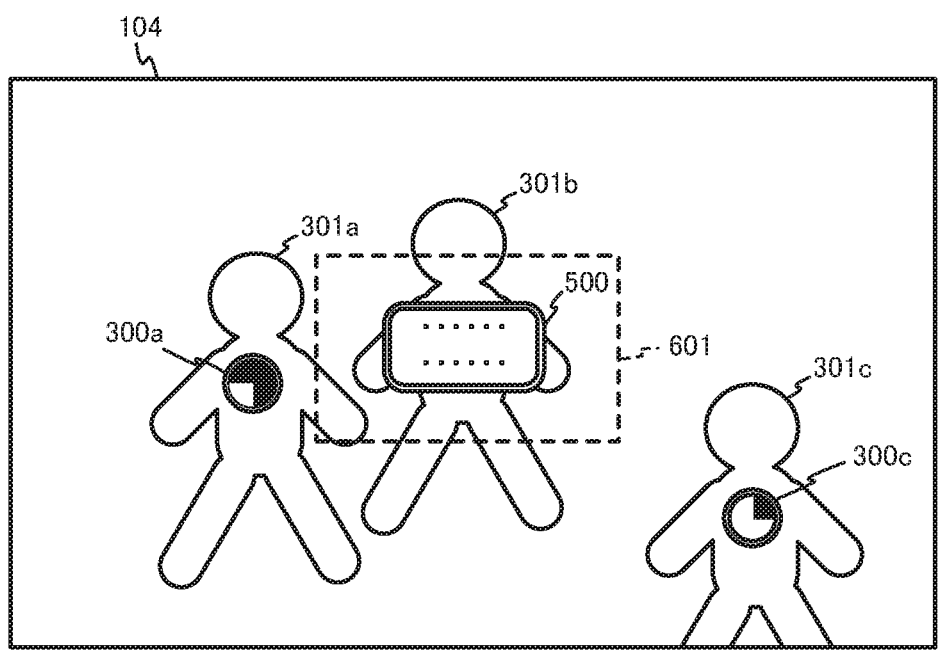
FIG. 6 is a drawing illustrating a display example of the second object.
Figure 7:
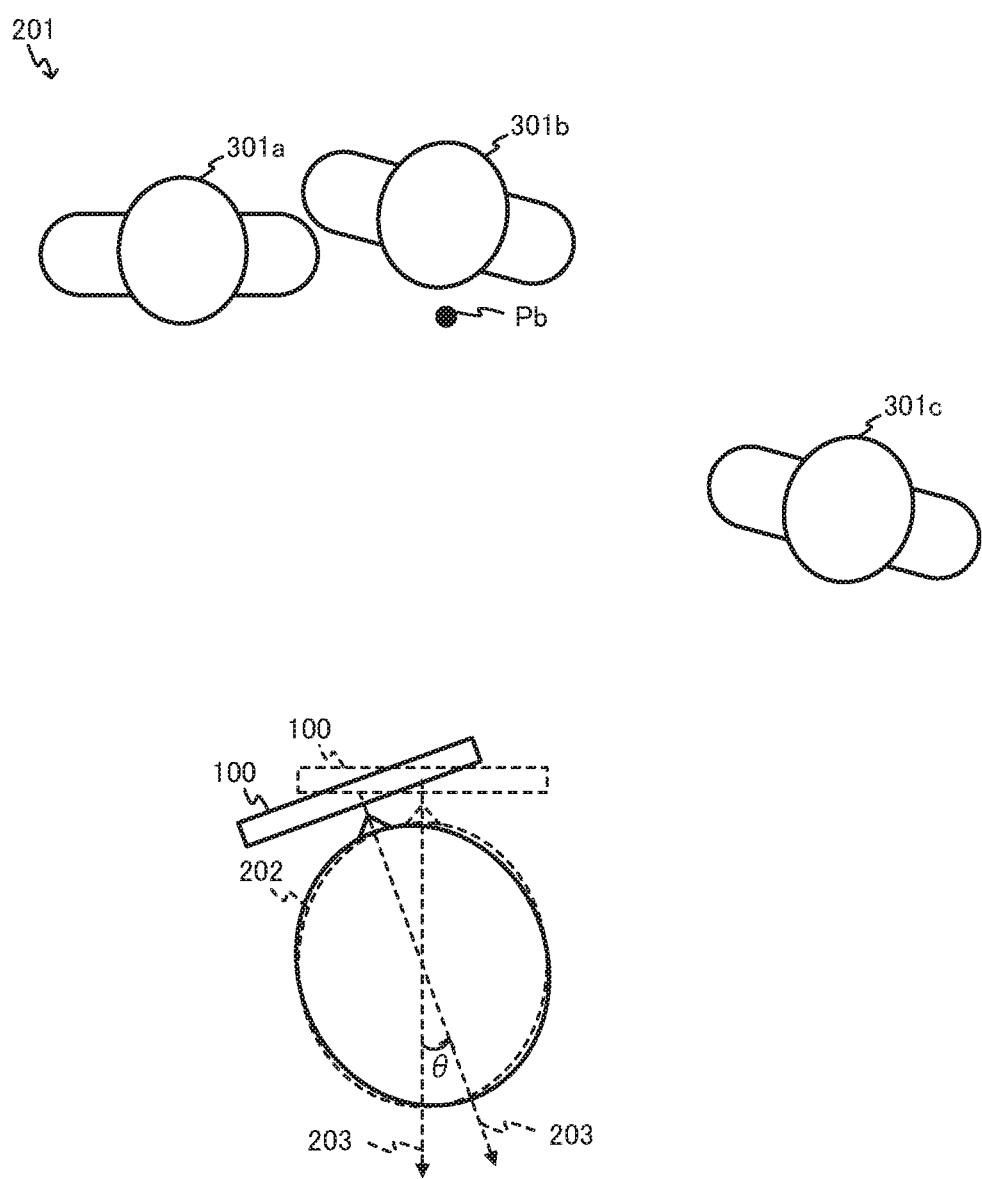
FIG. 7 is a top view illustrating the positional relationships in the real space between the display apparatus, the user, and the second object.
Figure 8:
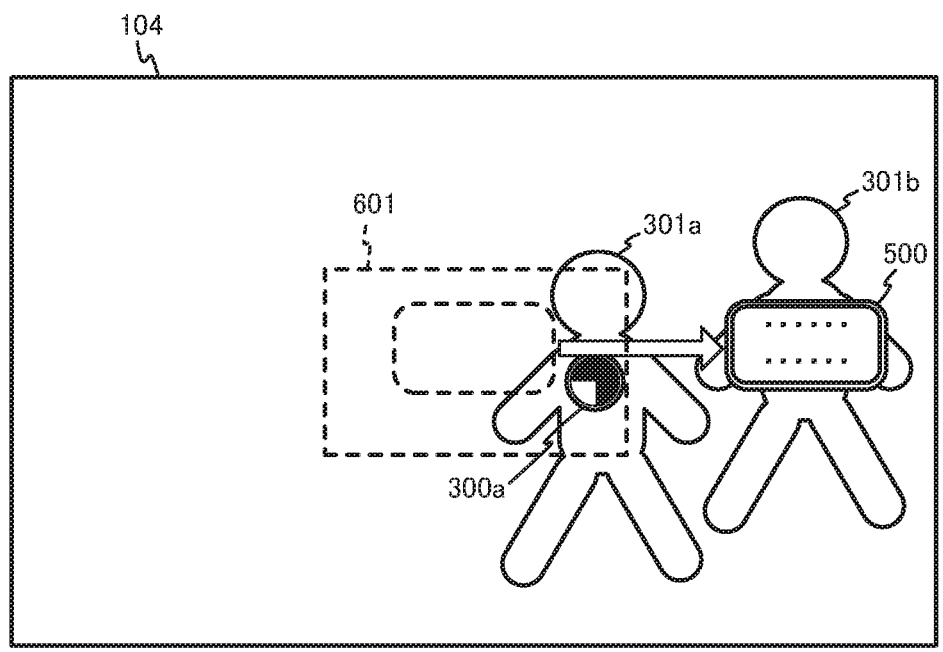
FIG. 8 is a drawing illustrating a display example of the second object, after the gaze direction has changed.

For example, as illustrated in FIG. 6, the displayer 112 displays the second object 500 that expresses information about the observation target 301b that is in the focus area 601 of the display 104. Furthermore, the displayer 112 changes the display position of the second object according to the orientation of the display apparatus 100 so as to make the second object 500 appear as if stationary in the real space 201. Specifically, when it is determined that the length of time on line of sight is greater than or equal to the first threshold time, as illustrated in FIG. 6, the displayer 112 displays the second object 500 on the display 104 so as to appear in the focus area 601, at a position Pb in front of the observation target 301b in the real space 201, as illustrated in FIG. 7. When, as illustrated in FIG. 7, the head of the user 202 is rotated θ in the counter-clockwise direction so as to move from the position of the dashed line to the position of the solid line, the displayer 112 detects the change in the orientation of the display apparatus 100 using the sensor section 105. Then, the displayer 112 displays the second object 500 such that the second object 500 appears as if stationary at the position Pb in the real space 201. Specifically, as illustrated in FIG. 8, the displayer 112 moves the second object 500 in the rightward direction in the display 104.

When the displaying of the second object 500 is started, the displayer 112 starts counting the time that the second object 500 is continuously on the line of sight of the user 202. That is, the displayer 112 starts counting the length of viewing time of the second object 500.

In the present embodiment, the controller 101 and the sensor section 105 cooperate to function as the displayer 112.

When the second object 500 is estimated as not being on the line of sight of the user 202 continuously for a second threshold time, set for the user 202, or longer, the remover 113 removes the second object 500 from the field of view of the user 202.

The second threshold time is a threshold time for estimating whether the user 202 is focused on the second object 500. The second threshold time is set for each user and is stored, for example, in the RAM 103.

When the estimator 111 estimates that the second object 500 is on the line of sight of the user 202, the remover 113 stops counting the length of viewing time of the second object 500, and starts counting the length of time that the second object 500 is estimated to be off the line of sight of the user 202 (length of time off line of sight). Then, when the length of time off line of sight is greater than or equal to the second threshold time, the remover 113 removes the second object 500 from the field of view of the user 202.

Figure 9:
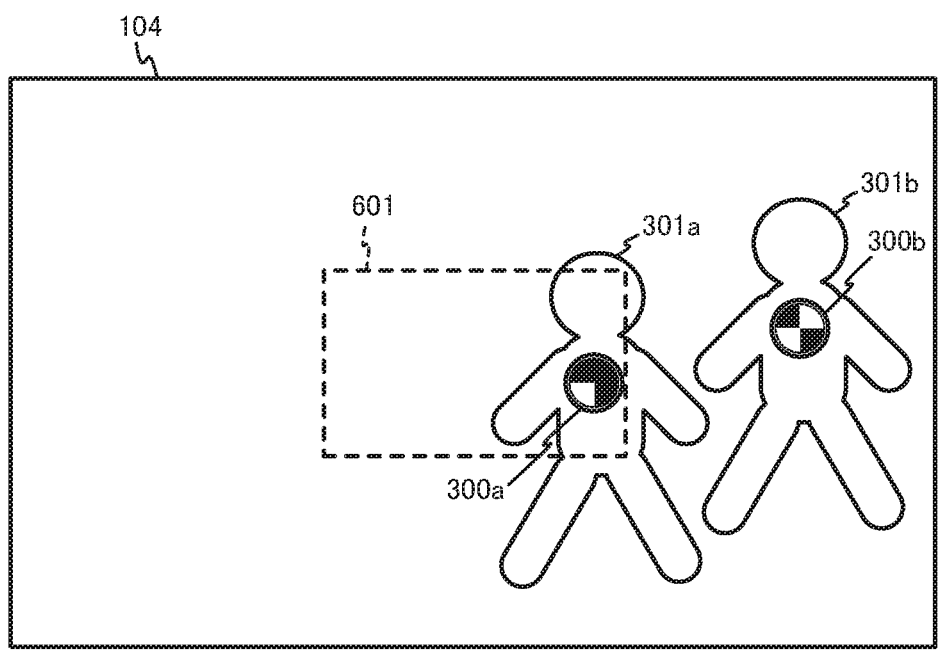
FIG. 9 is a drawing illustrating a display example of when the second object is removed from the display.

In one example, when, as illustrated in FIG. 8, the second object 500 is not displayed in the focus area 601 and the length of time off line of sight is greater than or equal to the second object 500, which corresponds to the estimator 111 estimating that the second object 500 is not on the line of sight of the user 202, the remover 113 ends the displaying of the second object 500, thereby removing the second object 500 from the display 104 as illustrated in FIG. 9.

That is, when the second object 500 is estimated as not being on the line of sight of the user 202 continuously for the second threshold time or longer, the remover 113 estimates that the user 202 is not focused on the second object 500. Then, the remover 113 removes that second object 500, estimated as not being focused on by the user 202, from the field of view of the user 202, that is, from the display 104.

In the present embodiment, the controller 101 functions as the remover 113.

The corrector 114 corrects the first threshold time according to the length of viewing time that the second object 500 is estimated as being on the line of sight of the user 202. Here, the first threshold time is set for the user 202. Specifically, when the length of viewing time is shorter than a predetermined threshold time, the corrector 114 performs a correction to lengthen the first threshold time by a predetermined amount of time.

That is, when the length of viewing time is shorter than the predetermined threshold time, the second object 500 is removed immediately after the passage of the second threshold time after the start of displaying. Specifically, the second object 500 is removed after an amount of time equivalent to the sum of the second threshold time and the length of viewing time has passed. When the length of viewing time of the second object 500 is shorter than the predetermined threshold time, there is a high possibility that the first threshold time is too short and that the first objects 300a to 300c that coincidentally passed through the focus area of the user 202 were displayed. That is, there is a high possibility that a second object 500 that expresses information about the first objects 300a to 300c, which the user 202 is not focused on, was displayed. As such, the corrector 114 performs a correction to lengthen the first threshold time.

In the present embodiment, the controller 101 functions as the corrector 114.

Figure 10:
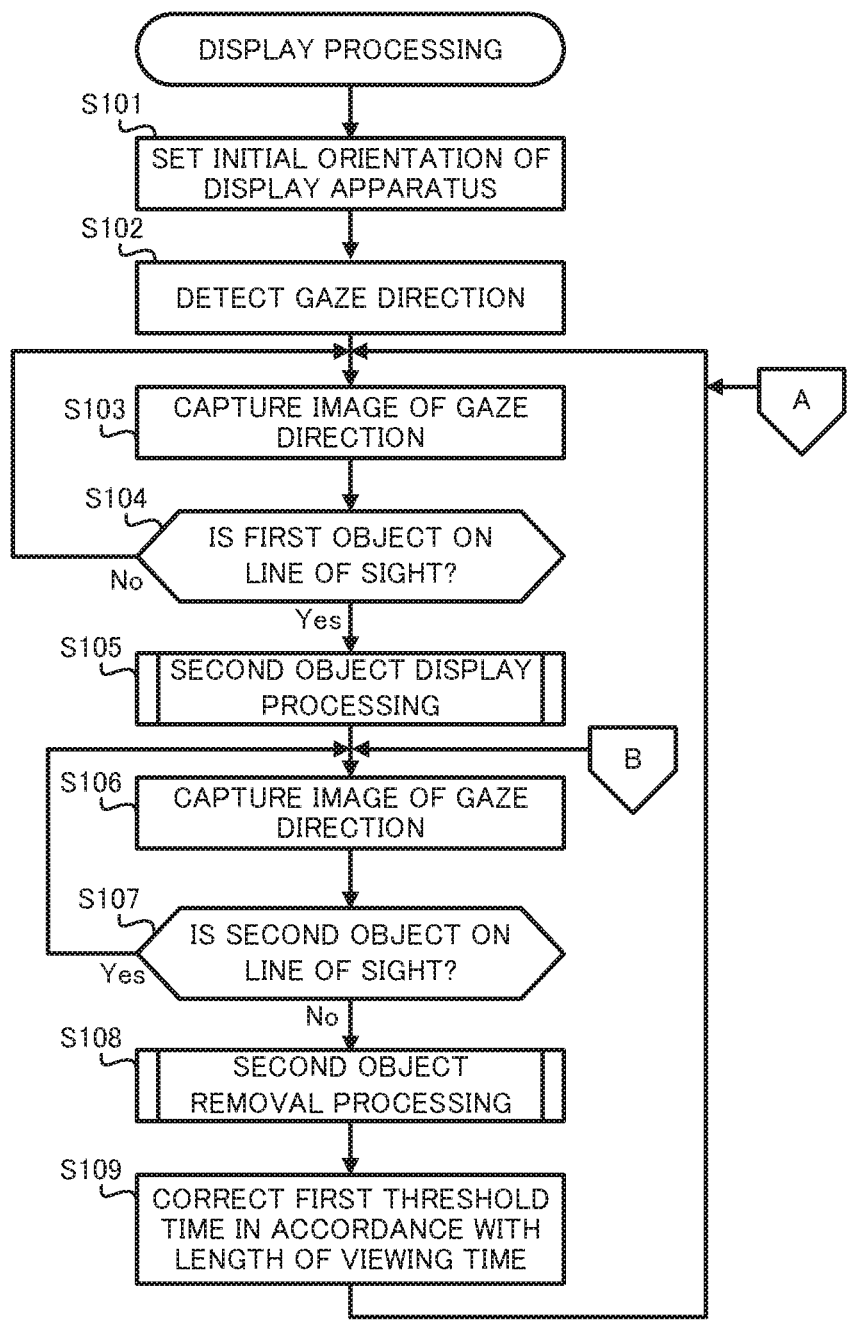
FIG. 10 is a flowchart illustrating the flow of display processing, executed by a controller of the display apparatus according to Embodiment 1.

Next, the operations of the display apparatus 100 according this embodiment of the present disclosure will be described. FIG. 10 is a flowchart illustrating the flow of display processing, executed by the controller 101 of the display apparatus 100. In one example, this processing is triggered by the receipt of a processing start command input via the operation device 107.

First, the display apparatus 100 sets the orientation of the display apparatus 100 in the real space 201 to a predetermined initial state (step S101).

Next, the display apparatus 100 detects the orientation of the display apparatus 100 and detects the gaze direction (step S102).

Next, the display apparatus 100 captures an image of the gaze direction (step S103).

Then, the display apparatus 100 determines, on the basis of the captured image captured in step S103, whether the first objects 300a to 300c are on the line of sight of the user 202 (step S104). When the display apparatus 100 determines that the first objects 300a to 300c are not on the line of sight of the user 202 (step S104; No), the display apparatus 100 executes the processing of step S103.

When the display apparatus 100 determines that the first objects 300a to 300c are on the line of sight of the user 202 (step S104; Yes), the display apparatus 100 executes second object display processing (step S105).

Figure 11:
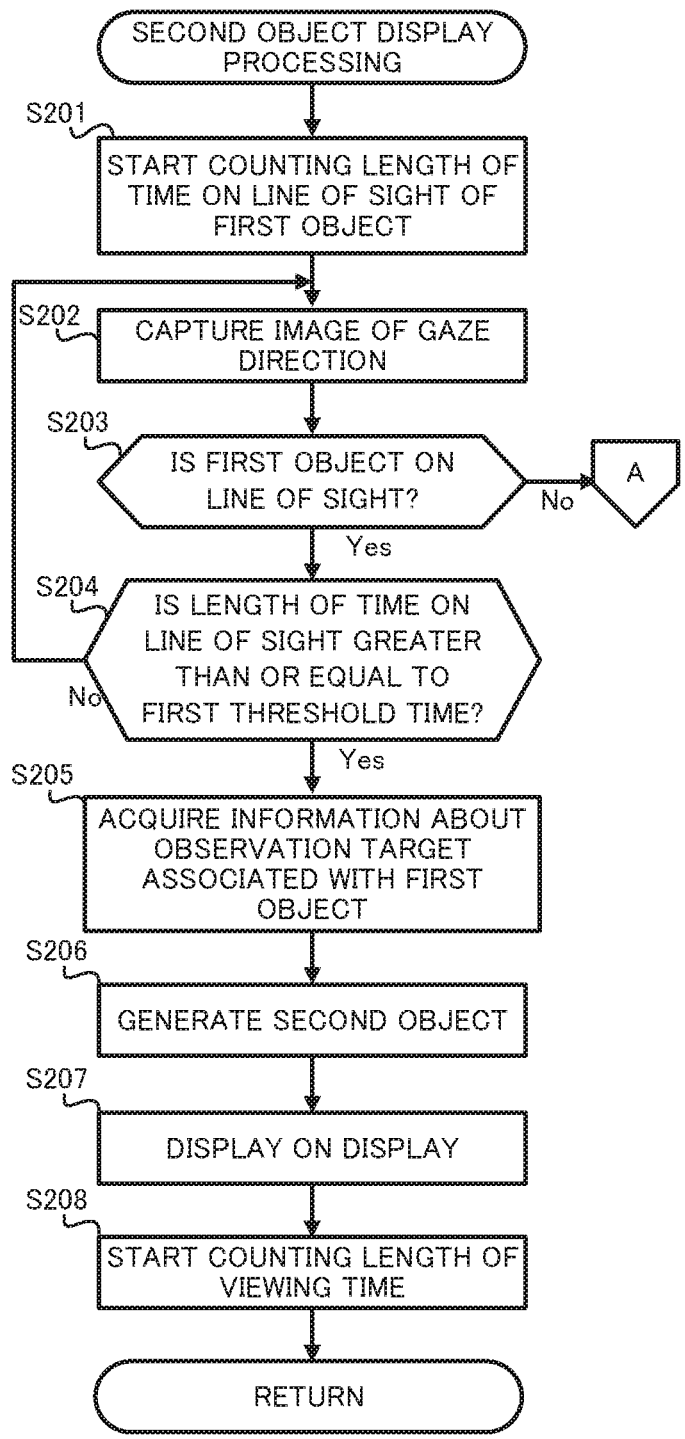
FIG. 11 is a flowchart illustrating the flow of second object display processing, executed by the controller of the display apparatus according to Embodiment 1.

FIG. 11 is a flowchart illustrating the flow of the second object display processing, executed by the controller 101 of the display apparatus 100.

When the second object display processing starts, the display apparatus 100 starts to count the length of time on line of sight of the first objects 300a to 300c, which are determined in step S104 of FIG. 10 to be on the line of sight of the user 202 (step S201).

The display apparatus 100 captures an image of the gaze direction (step S202).

The display apparatus 100 determines, on the basis of the captured image captured in step S202, whether the first objects 300a to 300c are on the line of sight of the user 202 (step S203). When the display apparatus 100 determines that the first objects 300a to 300c are not on the line of sight of the user 202 (step S203; No), the display apparatus 100 stops counting the length of time on line of sight and executes the processing of step S103 of FIG. 10.

When the display apparatus 100 determines that the first objects 300a to 300c are on the line of sight of the user 202 (step S203; Yes), the display apparatus 100 determines whether the length of time on line of sight is greater than or equal to the first threshold time (step S204). When the display apparatus 100 determines that the length of time on line of sight is not greater than or equal to the first threshold time (step S204; No), the display apparatus 100 executes the processing of step S202.

When the display apparatus 100 determines that the length of time on line of sight is greater than or equal to the first threshold time (step S204; Yes), the display apparatus 100 acquires the information about the observation targets 301a to 301c associated with the first objects 300a to 300c determined to be on the line of sight of the user 202 (step S205).

The display apparatus 100 generates a second object 500 that expresses the information acquired in step S205 (step S206).

The display apparatus 100 displays the second object 500 generated in step S206 on the display 104 (step S207).

The display apparatus 100 starts counting the length of viewing time (step S208). Then, the display apparatus 100 ends the second object display processing and executes step S106 of FIG. 10.

Returning to FIG. 10, the display apparatus 100 captures an image of the gaze direction (step S106).

Then, the display apparatus 100 determines whether the second object 500, displayed by the second object display processing of step S105, is on the line of sight of the user 202 (step S107). When the display apparatus 100 determine that the second object 500 is on the line of sight of the user 202 (step S107; Yes), the display apparatus 100 executes the processing of step S106.

When the display apparatus 100 determines that the second object 500 is not on the line of sight of the user 202

(step S107; No), the display apparatus 100 executes second object removal processing (step S108).

Figure 12:
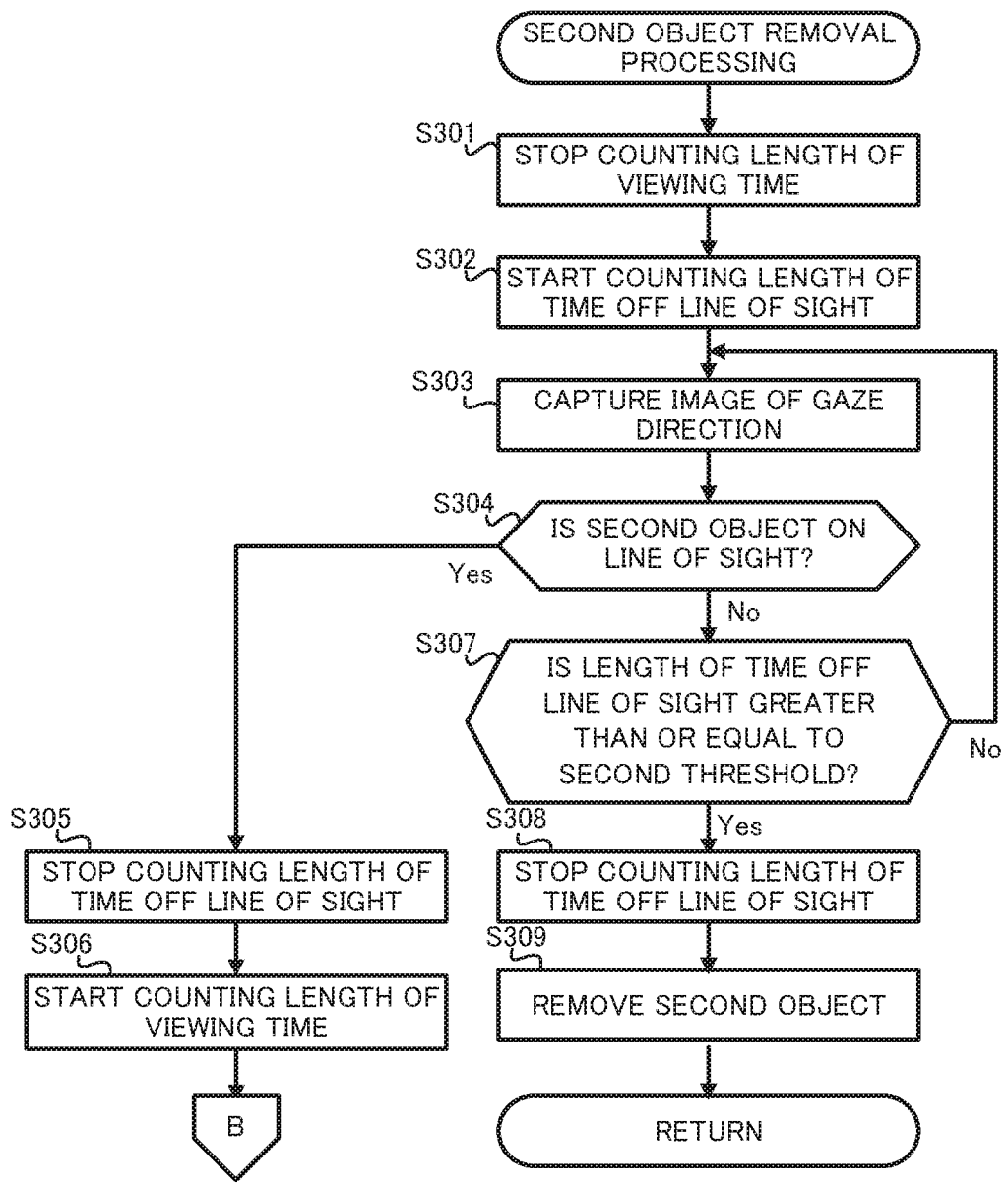
FIG. 12 is a flowchart illustrating the flow of second object removal processing, executed by the controller of the display apparatus according to Embodiment 1.

FIG. 12 is a flowchart illustrating the flow of the second object removal processing, executed by the controller 101 of the display apparatus 100.

When the second object removal processing starts, the display apparatus 100 stops counting the length of viewing time of the second object 500 (step S301). Then, the display apparatus 100 starts counting the length of time off line of sight of the second object 500 (step S302).

The display apparatus 100 captures an image of the gaze direction (step S303).

The display apparatus 100 determines, on the basis of the captured image captured in step S303, whether the second object 500 is on the line of sight of the user 202 (step S304).

When the display apparatus 100 determines that the second object 500 is on the line of sight of the user 202 (step S304; Yes), the display apparatus 100 stops counting the length of time off line of sight (step S305). Then, the display apparatus 100 starts counting the length of viewing time (step S306), and executes step S106 of FIG. 10.

When the display apparatus 100 determines that the second object 500 is not on the line of sight of the user 202 (step S304; No), the display apparatus 100 determines whether the length of time off line of sight is greater than or equal to the second threshold time (step S307). When the display apparatus 100 determines that the length of time off line of sight is not greater than or equal to the second threshold time (step S307; No), the display apparatus 100 executes the processing of step S303.

When the display apparatus 100 determines that length of time off line of sight is greater than or equal to the second threshold time (step S307; Yes), the display apparatus 100 stops counting the length of time off line of sight (step S308). Then, the display apparatus 100 removes the second object 500 from the field of view of the user 202 (step S309), and executes the processing of step S109.

Returning to FIG. 10, the display apparatus 100 corrects the first threshold time in accordance with the length of viewing time up to when the counting of the length of viewing time is stopped by the second object removal processing of step S108 (step S109). Then, the display apparatus 100 executes the processing of step S103.

In one example, the display apparatus 100 repeats the processing described above until an end command is received via the operation device 107.

As described above, the display apparatus 100 according to the present embodiment corrects, in accordance with the length of viewing time of the second object 500, the first threshold that is used for estimating whether the user 202 is focused on the first objects 300a to 300c. As such, the display apparatus 100 can appropriately determine if the first objects 300a to 300c on the line of sight of the user 202 are objects that the user 202 is intentionally focused on or are objects that have coincidentally passed through the line of sight of the user 202.

Additionally, when the length of viewing time of the second object 500 is shorter than the predetermined threshold time, the display apparatus 100 performs a correction to lengthen the first threshold time by the predetermined amount of time. When the length of viewing time of the second object 500 is shorter than the predetermined threshold time, there is a high possibility that a second object 500, of the first objects 300a to 300c that coincidentally passed through the line of sight of the user 202, has been displayed. In such a case, the first threshold time is lengthened and, as a result, the first threshold time, which is used for estimating whether the user 202 is focused on the first objects 300a to 300c, can be appropriately corrected depending on the user 202.

Embodiment 2

In Embodiment 1 described above, an example is described in which it is determined whether the user 202 is focused on the first objects 300a to 300c by comparing the length of time on line of sight of the first objects 300a to 300c with the first threshold time. In the present embodiment, an example is described in which it is determined whether the user 202 is focused on the first objects 300a to 300c by displaying a third object that is associated with the first objects 300a to 300c, and comparing the length of time on line of sight of the third object with the first threshold time. Note that, in Embodiment 2, components that are the same as in Embodiment 1 are marked with the same reference numerals, and detailed descriptions thereof are forgone.

Figure 13:
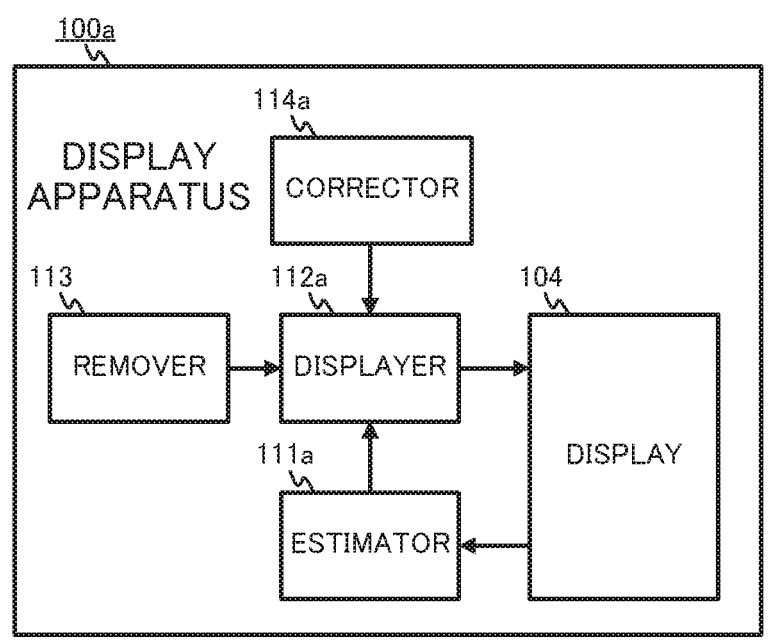
FIG. 13 is a schematic block diagram illustrating the functional configuration of a display apparatus according to Embodiment 2.

FIG. 13 is a schematic block diagram illustrating the functional configuration of a display apparatus 100a according to this embodiment of the present disclosure. As illustrated in FIG. 13, the display apparatus 100a includes an estimator 111a, a displayer 112a, a remover 113, a corrector 114a, and a display 104.

The estimator 111a also estimates whether the third object is on the line of sight of the user 202. The estimator 111a can estimate whether the third object is on the line of sight of the user 202, in the same manner as the second object 500 in Embodiment 1.

When the first objects 300a to 300c are estimated as being on the line of sight of the user 202 continuously for a third threshold time or longer, the displayer 112a displays the third object that is associated with the first objects 300a to 300c in the field of view of the user 202. Here, the third threshold time is shorter than the first threshold time and is set for the user 202. Moreover, when the third object is estimated as being on the line of sight of the user 202 continuously for the first threshold time or longer, the displayer 112a removes the third object from the field of view of the user 202, and displays the second object 500 in the field of view of the user 202. When the third object is estimated as not being on the line of sight of the user 202 continuously for the first threshold time or longer, the displayer 112a removes the third object from the field of view of the user 202.

Here, the third threshold time is a threshold time for preliminarily determining whether the user 202 is focused on the first objects 300a to 300c. The third threshold time is set shorter than the first threshold time. For example, the third threshold time may be calculated on the basis of the first threshold time such that: third threshold time=first threshold time×k (constant of 0<k<1).

The third object is an object that is used in place of the first objects 300a to 300c to determine whether the user 202 is focused on the first objects 300a to 300c. In one example the third object is a humanoid object.

Figure 14A:
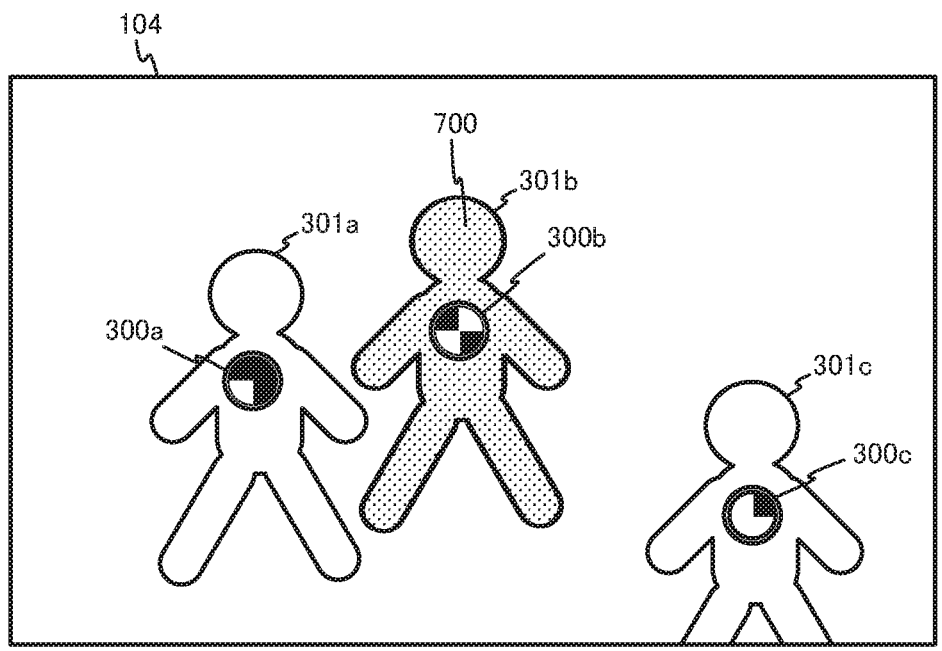
FIG. 14A is a drawing illustrating a display example of when a third object appears.

Furthermore, the displayer 112a causes the third object to appear at the same position in the real space 201 as the first objects 300a to 300c. Moreover, the displayer 112a displays the third object so as to maintain the appearance position of the third object in the real space 201. For example, when, as illustrated in FIG. 4, the first object 300b is estimated as being on the line of sight of the user 202 continuously for the third threshold time or longer, as illustrated in FIG. 14A, the displayer 112a displays, at that time, a third object 700 on the display 104 such that the third object 700 appears at the position of the first object 300b in the real space 201. Moreover, as with the second object 500 of Embodiment 1, the displayer 112a changes the display position of the third object 700 in accordance with the orientation of the display apparatus 100a so as to make the third object 700 appear as if stationary in the real space 201. Accordingly, when, for example, the observation target 301b wearing the first object 300b moves in the leftward direction without the user 202 changing the gaze direction, the third object 700 is displayed as if stationary at the position of the first object 300b at the time of appearance, as illustrated in FIG. 14B.

Figure 14B:
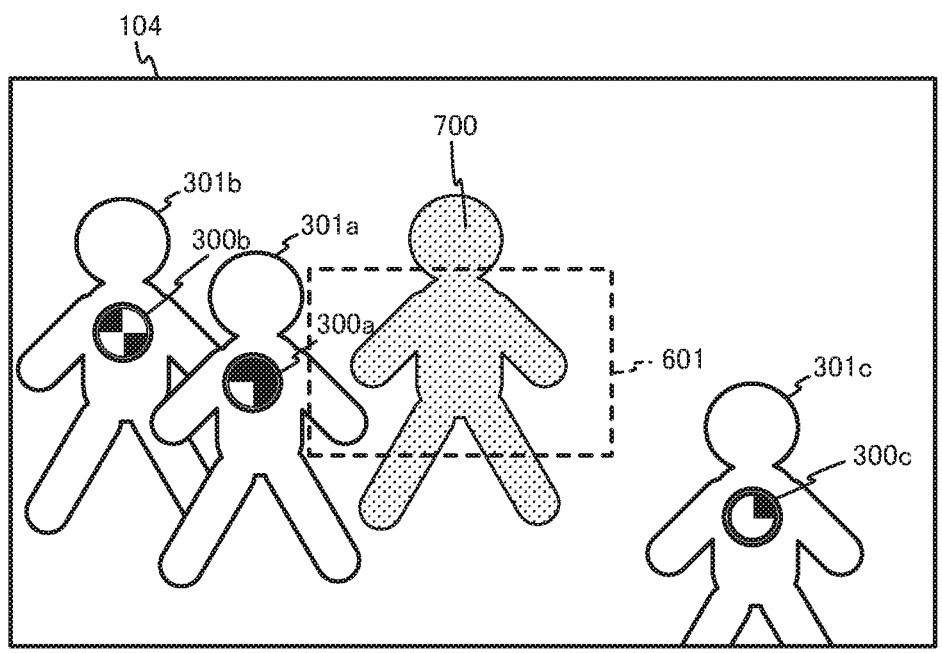
FIG. 14B is a drawing illustrating a display example of a case in which, after the third object appears, a first object moves.
Figure 15:
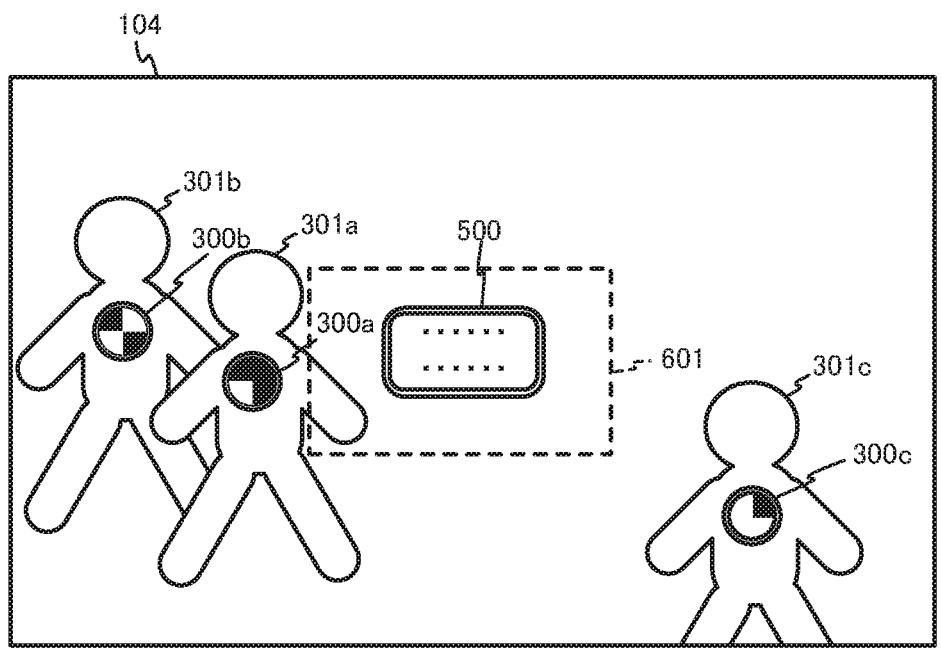
FIG. 15 is a drawing illustrating a display example of the second object.

When, as illustrated in FIG. 14B, the third object 700 is estimated to be in the focus area 601, that is, on the line of sight of the user 202 continuously, for the first threshold time or longer, the displayer 112a removes the third object 700 from the field of view of the user 202, and displays the second object 500 in the field of view of the user 202, as illustrated in FIG. 15. When the third object 700 is estimated as not being on the line of sight of the user 202 continuously for the first threshold time or longer, the displayer 112a removes the third object 700 from the field of view of the user 202.

After the second object 500 is displayed as a result of the third object 700 being estimated as being on the line of sight of the user 202 continuously for the first threshold time or longer, the corrector 114a corrects the third threshold time that is set for the user 202, in accordance with the length of viewing time that the second object 500 is estimated as being on the line of sight of the user 202.

Specifically, as with the first threshold time of Embodiment 1, when the length of viewing time is shorter than a predetermined threshold time, the corrector 114a performs a correction to lengthen the third threshold time by a predetermined amount of time. That is, when the length of viewing time of the second object 500 is shorter than the predetermined threshold time, there is a high possibility that the third threshold time is too short and that first objects 300a to 300c that coincidentally passed through the focus area of the user 202 were displayed. That is, there is a high possibility that a third object 700, associated with the first objects 300a to 300c that the user 202 is not focused on, was displayed. As such, the corrector 114a performs a correction to lengthen the third threshold time.

Figure 16:
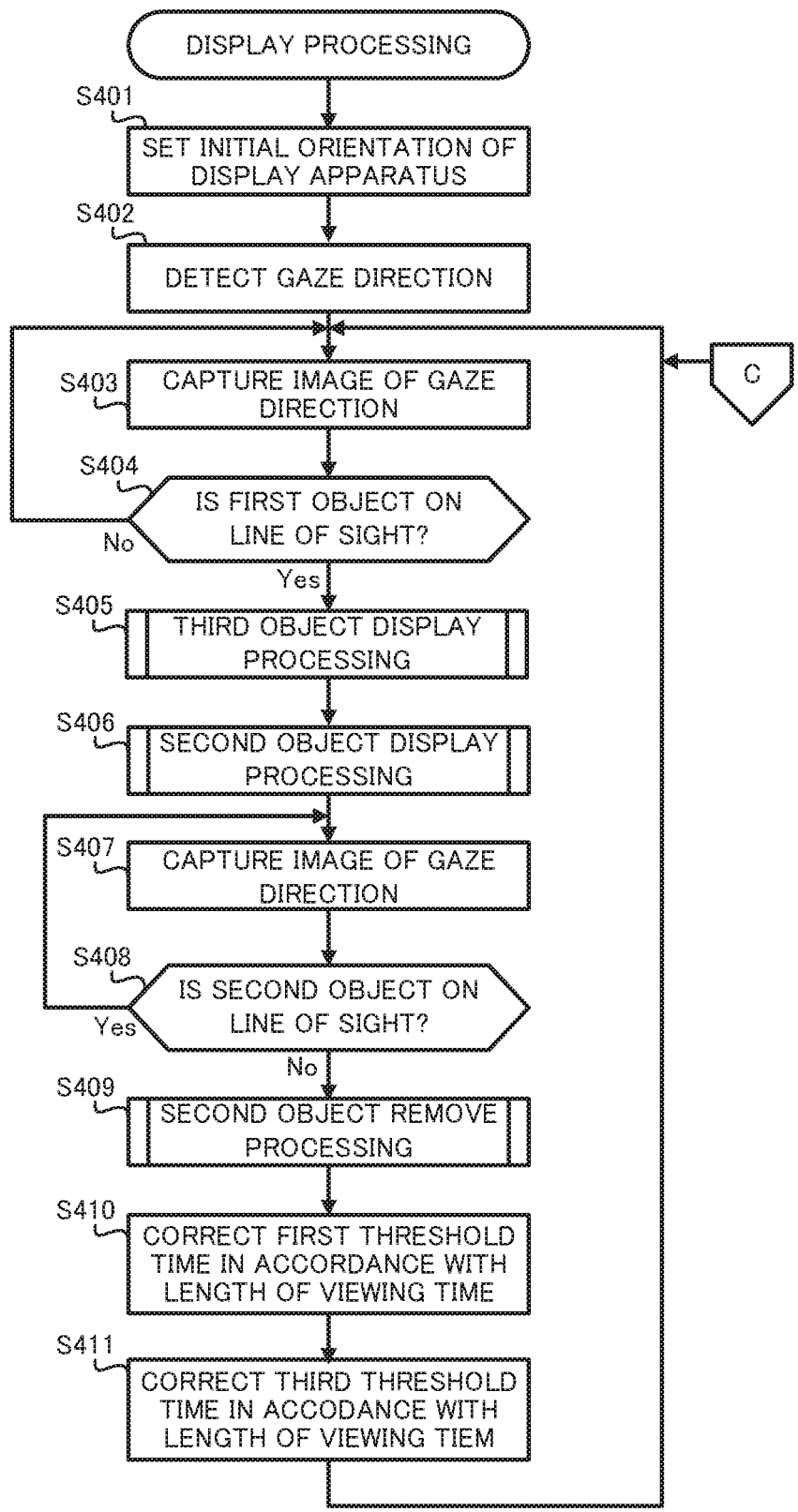
FIG. 16 is a flowchart illustrating the flow of display processing, executed by a controller of the display apparatus according to Embodiment 2.

Next, the operations of the display apparatus 100a according this embodiment of the present disclosure will be described. FIG. 16 is a flowchart illustrating the flow of display processing, executed by the controller 101 of the display apparatus 100a. In one example, this processing is triggered by the receipt of a processing start command input via the operation device 107.

First, the display apparatus 100a executes the processing of steps S401 to S404 in the same manner as steps S101 to S104 of the display processing illustrated in FIG. 10.

When the display apparatus 100a determines that the first objects 300a to 300c are on the line of sight of the user 202 (step S404; Yes), the display apparatus 100a executes third object display processing (step S405).

Figure 17:
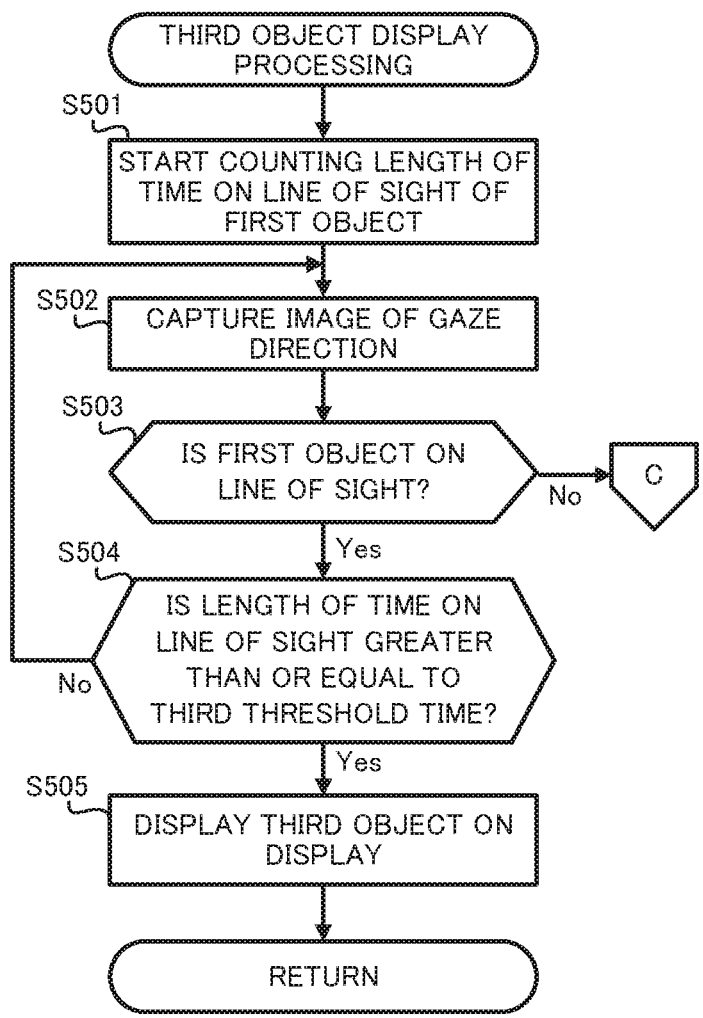
FIG. 17 is a flowchart illustrating the flow of third object display processing, executed by the controller of the display apparatus according to Embodiment 2.

FIG. 17 is a flowchart illustrating the flow of third object display processing, executed by the controller 101 of the display apparatus 100a.

When the third object display processing starts, the display apparatus 100a starts to count the length of time on line of sight of the first objects 300a to 300c, which are determined in step S404 of FIG. 16 as being on the line of sight of the user 202 (step S501).

The display apparatus 100a captures an image of the gaze direction (step S502).

The display apparatus 100a determines, on the basis of the captured image captured in step S502, whether the first objects 300a to 300c are on the line of sight of the user 202 (step S503). When the display apparatus 100a determines that the first objects 300a to 300c are not on the line of sight of the user 202 (step S503; No), the display apparatus 100a stops counting the length of time on line of sight and executes the processing of step S403 of FIG. 16.

When the display apparatus 100a determines that a first object is on the line of sight of the user 202 (step S503; Yes), the display apparatus 100a determines whether the length of time on line of sight is greater than or equal to the third threshold time (step S504). When the display apparatus 100a determines that the length of time on line of sight is not greater than or equal to the third threshold time (step S504; No), the display apparatus 100a executes the processing of step S502.

When the display apparatus 100a determines that the length of time on line of sight is greater than or equal to the third threshold time (step S504; Yes), the display apparatus 100a displays the third object 700 on the display 104 (step S505). Then, the display apparatus 100a executes the processing of step S406 of FIG. 16.

Returning to FIG. 16, the display apparatus 100a executes the second object display processing (step S406).

Figure 18:
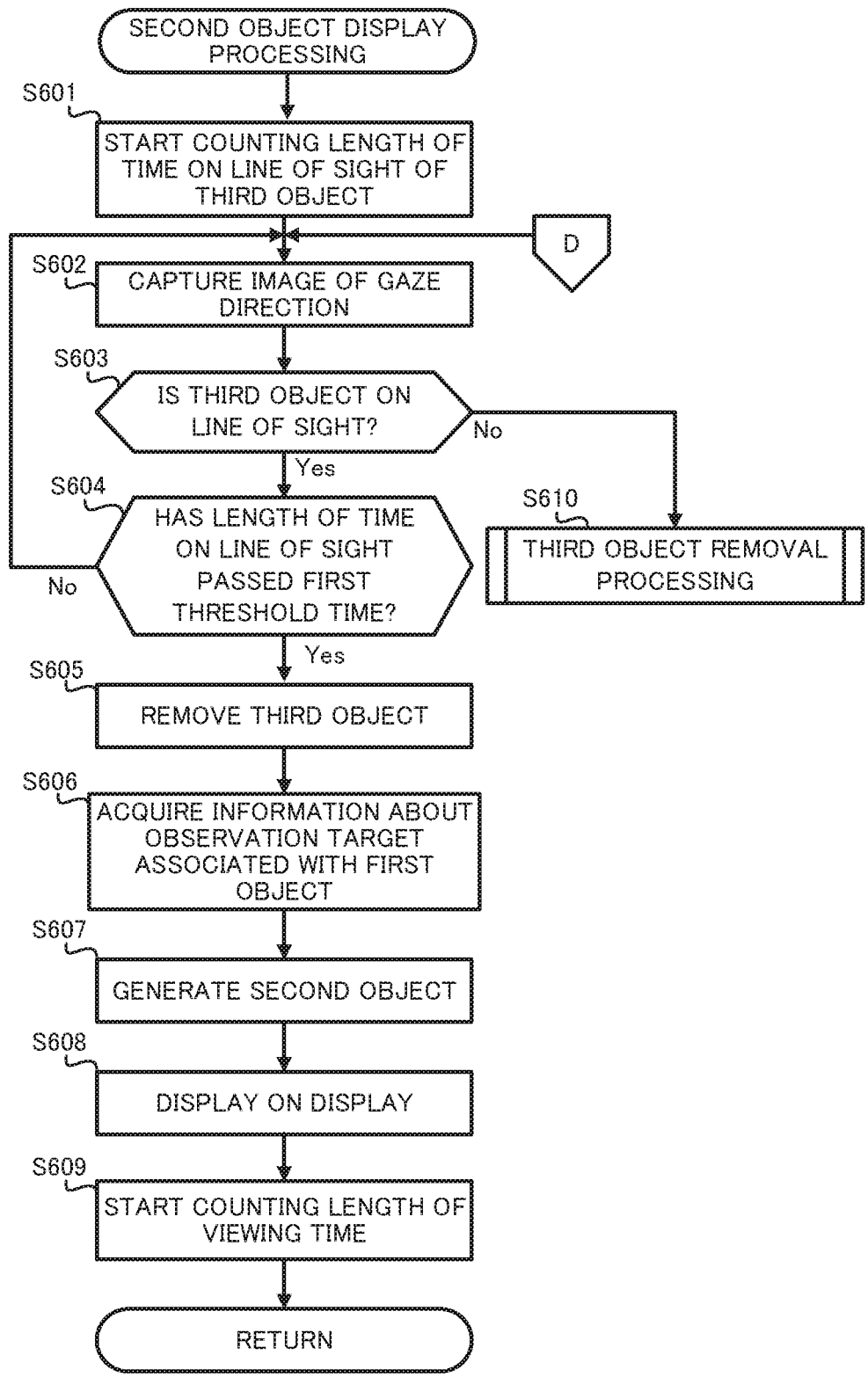
FIG. 18 is a flowchart illustrating the flow of second object display processing, executed by the controller of the display apparatus according to Embodiment 2.

FIG. 18 is a flowchart illustrating the flow of second object display processing, executed by the controller 101 of the display apparatus 100a.

When the second object display processing starts, the display apparatus 100a starts counting the length of time on line of sight of the third object 700 (step S601).

The display apparatus 100a captures an image of the gaze direction (step S602).

The display apparatus 100a determines, on the basis of the captured image captured in step S602, whether the third object 700 is on the line of sight of the user 202 (step S603).

When the display apparatus 100a determines that the third object 700 is on the line of sight of the user 202 (step S603; Yes), the display apparatus 100a determines whether the length of time on line of sight has passed the first threshold time (step S604). When the display apparatus 100a determines that the length of time on line of sight has not passed the first threshold time (step S604; No), the display apparatus 100a executes the processing of step S602.

When the display apparatus 100a determines that length of time on line of sight has passed the first threshold time (step S604; Yes), the display apparatus 100a removes the third object 700 (step S605).

The display apparatus 100a acquires information about the observation targets 301a to 301c of the first objects 300a to 300c associated with the third object 700 (step S606).

The display apparatus 100a generates a second object that expresses the information acquired in step S606 (step S607).

The display apparatus 100a displays the second object generated in step S607 on the display 104 (step S608).

Then, the display apparatus 100a starts counting the length of viewing time (step S609). Moreover, the display apparatus 100a ends the second object display processing and executes step S407 of FIG. 16.

When it is determined that the third object 700 is not on the line of sight of the user 202 (step S603; No), the display apparatus 100a executes third object removal processing (step S610).

Figure 19:
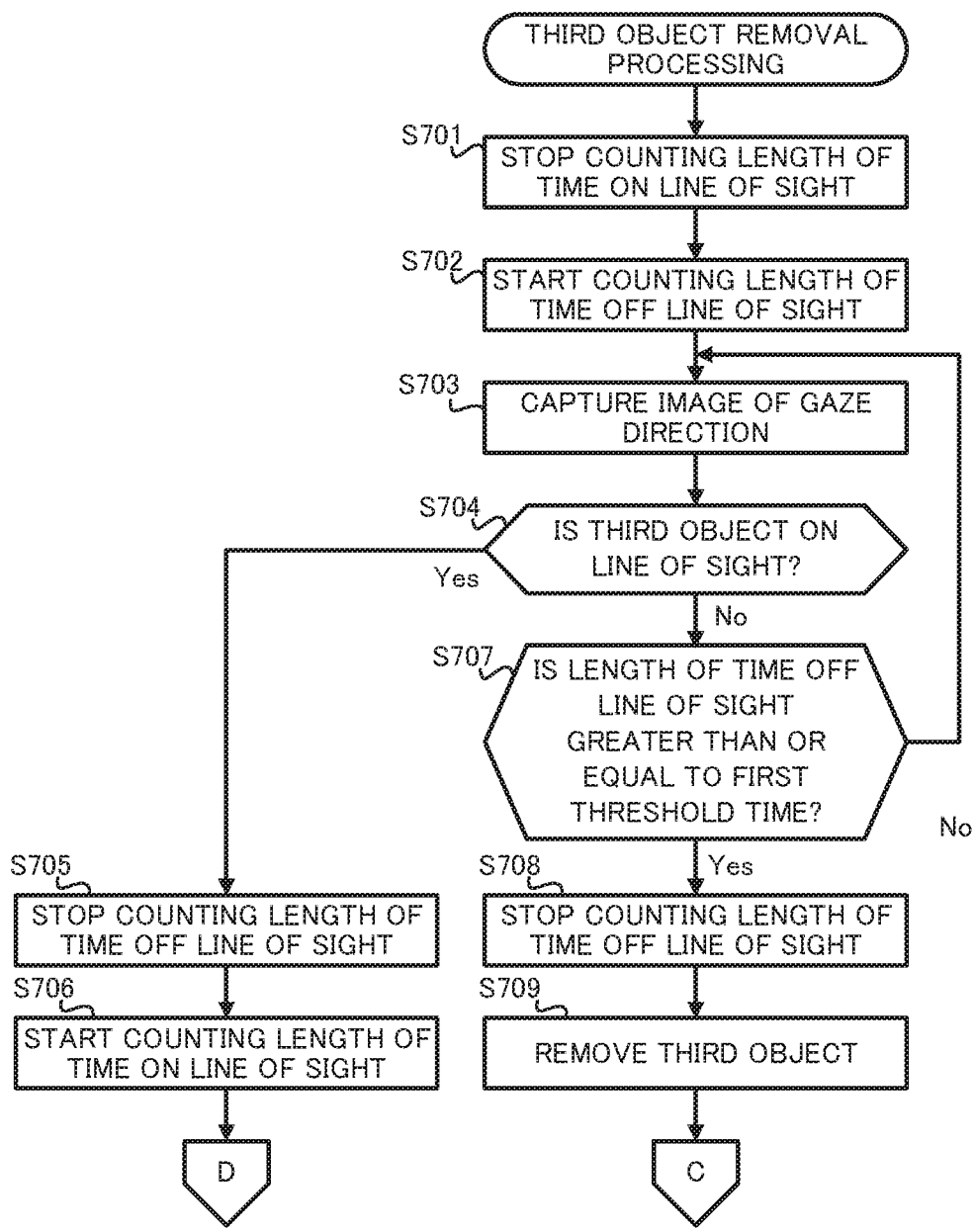
FIG. 19 is a flowchart illustrating the flow of third object removal processing, executed by the controller of the display apparatus according to Embodiment 2.

FIG. 19 is a flowchart illustrating the flow of the third object removal processing, executed by the controller 101 of the display apparatus 100a.

When the third object removal processing starts, the display apparatus 100a stops counting the length of time on line of sight of the third object 700 (step S701). Then, the display apparatus 100a starts counting the length of time off line of sight of the third object 700 (step S702).

The display apparatus 100a captures an image of the gaze direction (step S703).

The display apparatus 100a determines, on the basis of the captured image captured in step S703, whether the third object 700 is on the line of sight of the user 202 (step S704).

When the display apparatus 100a determines that the third object 700 is on the line of sight of the user 202 (step S704; Yes), the display apparatus 100a stops counting the length of time off line of sight (step S705). Then, the display apparatus 100a starts counting the length of time on line of sight of the third object 700 (step S706), and executes step S602 of FIG. 18.

When the display apparatus 100a determines that the third object 700 is not on the line of sight of the user 202 (step S704; No), the display apparatus 100a determines whether the length of time off line of sight is greater than or equal to the first threshold time (step S707). When the display apparatus 100a determines that the length of time off line of sight is not greater than or equal to the first threshold time (step S707; No), the display apparatus 100a executes the processing of step S703.

When it is determined that length of time off line of sight is greater than or equal to the first threshold time (step S707; Yes), the display apparatus 100a stops counting the length of time off line of sight (step S708). Then, the display apparatus 100a removes the third object 700 from the field of view of the user 202 (step S709) and executes the processing of step S403 of FIG. 16.

Returning to FIG. 16, the display apparatus 100a executes the processing of steps S407 to S410 in the same manner as steps S106 to S109 of the display processing of FIG. 10.

The display apparatus 100a corrects the third threshold time in accordance with the length of viewing time up to when the counting of the length of viewing time is stopped by the second object removal processing of step S409 (step S411). Then, the display apparatus 100a executes the processing of step S403.

In one example, the display apparatus 100a repeats the processing described above until an end command is received via the operation device 107.

As described above, the third object 700 is displayed when the display apparatus 100a according to the present embodiment estimates the first objects 300a to 300c as being on the line of sight of the user 202 continuously for the third threshold time or longer. Moreover, when the third object 700 is estimated as being on the line of sight of the user 202 continuously for the first threshold time or longer, the third object 700 is removed and the second object 500 is displayed. As such, even when the first objects 300a to 300c, at which the second object 500 is desired to be displayed, are moving, the third object 700 can be caused to be displayed by the user 202 focusing on the first objects 300a to 300c for the third threshold time, which is shorter than the first threshold time, and the second object can be caused to be displayed by the user 202 focusing on that third object 700 for the first threshold time. Thus, the user 202 can more easily cause the second object 500 to be displayed than in a case in which the second object 500 is displayed as a result of the user 202 continuously focusing on the first objects 300a to 300c for the first threshold time.

The display apparatus 100a corrects the third threshold time in accordance with the length of viewing time that is estimated as being on the line of sight of the user 202 due to the third object 700 being estimated as being on the line of sight of the user 202 continuously for the first threshold time or longer. As such, the display apparatus 100a can appropriately correct the third threshold time, depending on the user 202, for preliminarily determining if the first objects 300a to 300c on the line of sight of the user are objects that the user 202 is intentionally focused on or are objects that have coincidentally passed through the line of sight of the user 202.

Embodiments of the present disclosure are described above, but these embodiments are merely examples and do not limit the scope of application of the present disclosure. That is, various applications of the embodiments of the present disclosure are possible, and all embodiments are included in the scope of the present disclosure.

In Embodiment 1 and Embodiment 2 described above, examples are described in which the first objects 300a to 300c are AR markers that express predetermined pattern images. However, other types of objects may be used as the first object. For example, the first object may be any desired object that is present in the real space 201. In this case, the display apparatus 100 or 100a may store a shape pattern of the object in advance and recognize the object, using image recognition, on the basis of a captured image and the shape.

Furthermore, the first object may be an object in virtual space. In this case, the display apparatus 100 or 100a may detect the gaze direction in the virtual space according to the orientation of the display apparatus 100 or 100a, and estimate the first object on the line of sight of the user 202 on the basis of a known position, movement speed, or the like of the first object in the virtual space.

In Embodiments 1 and 2 described above, examples are described in which the display apparatuses 100 and 100a estimate, by image detection, whether the first objects 300a to 300c are on the line of sight of the user 202, and estimate whether the second object 500 and the third object 700 are on the line of sight of the user 202 by causing the gaze direction and the focus area 601 in accordance with the orientation of the display apparatus 100 or 100a. However, the methods whereby the estimator 111 estimates whether the first objects 300a to 300c, the second object 500, and the third object 700 are on the line of sight of the user 202 are not limited thereto. A configuration is possible in which the display apparatus 100 or 100a detects the line of sight of the user by eye tracking, and estimates whether the first objects 300a to 300c, the second object 500, and the third object 700 are on the line of sight of the user 202.

In Embodiments 1 and 2 described above, examples are described in which, when the length of viewing time of the second object 500 is shorter than the predetermined threshold time, the display apparatus 100 or 100a lengthens the first threshold time or the third threshold time by a predetermined amount of time. However, the method of correcting the first threshold time and the third threshold time in accordance with the length of viewing time is not limited thereto.

For example, a configuration is possible in which the display apparatus 100 or 100a calculates the distribution of the occurrence frequency of the length of viewing time of the second object 500, and corrects the first threshold time and the third threshold time on the basis of that distribution. In one example, the display apparatus 100 or 100a records the length of viewing time of the second object 500, thereby acquiring a distribution such as that illustrated in FIG. 20A. In FIG. 20A, the length of viewing time of the second object 500 is shown on the horizontal axis and the occurrence frequency of the length of viewing time is shown on the vertical axis. It is thought that a trend will exist in which, when information that the user 202 is interested in is displayed on the second object 500, the length of viewing time increases, and when information that the user 202 is not interested in is displayed on the second object 500, the length of viewing time decreases. Accordingly, as illustrated in FIG. 20A, it is thought that the distribution of the occurrence frequency of the length of viewing time will have two peaks, namely a peak on the side where the length of viewing time is short, and a peak on the side where the length of viewing time is long. As such, when, for example, a distribution of the length of viewing time t of 0≤t≤tc is obtained, the distribution may be trisected into 0≤t≤ta, ta≤t≤tb, and tb≤t≤tc, and the first threshold time T1 may be corrected on the basis of the distribution of the length of viewing time t such that, when the length of viewing time t is in the range 0≤t≤ta, the first threshold time T1 is multiplied by 1.05, when the length of viewing time t is in the range ta≤t≤tb, the current first threshold time T1 is maintained, and when the viewing time t length is in the range tb≤t≤tc, the first threshold time T1 is multiplied by 0.96. Note that the degrees to which the first threshold time T1 increases or decreases when the length of viewing time t is in the range 0≤t<ta or the range tb≤t≤tc is not limited to the examples described above. For example, it is possible to appropriately set constants C1 and C2 such that, when the length of viewing time t is in the range 0≤t<ta, the first threshold time T1 is C1×T1 (where C1>1 and C1 is a constant close to 1), and when the length of viewing time t is in the range tb≤t≤tc, the first threshold time T1 is C2×T1 (where C2<1 and C2 is a constant close to 1).

As illustrated in FIG. 20B, a configuration is possible in which the first threshold time is increased or decreased a predetermined amount of time with the length of viewing time td, which is the valley between the two peaks in the distribution of the length of viewing time, as a threshold. For example, the first threshold time may be increased a predetermined amount of time a (where a is a positive number) when the length of viewing time t is in the range 0≤t<td, which is the peak side of the length of viewing time where the length of viewing time is short, and decreased the predetermined amount of time a when the length of viewing time t is in the range td≤t, which is the peak side of the length of viewing time where the length of viewing time is long.

Figure 20C:
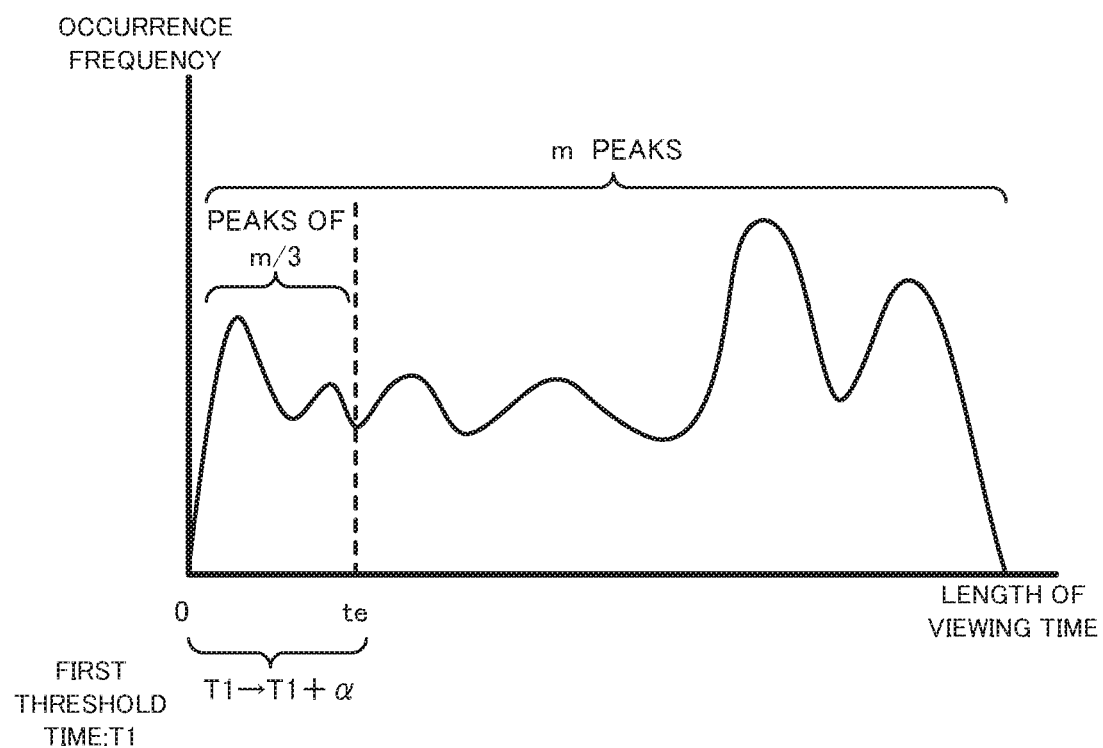
FIG. 20C is a drawing for explaining an example of correcting the first threshold time in accordance with the length of viewing time.

As illustrated in FIG. 20C, in a case in which there are m peaks (where m≥3) in the distribution of the length of viewing time, when the length of viewing time t is in the range 0≤t<te that belongs to the peak m/3 from the short length of viewing time side, the first threshold time T1 may be increased the predetermined amount of time a.

In the examples illustrated in FIGS. 20A to 20C, cases are described in which the first threshold time is corrected on the basis of the distribution of the length of viewing time, but it should be noted that the third threshold time may also be corrected on the basis of the distribution of the length of viewing time via the same methods.

In Embodiment 2, an example is described in which, after appearing, the third object 700 remains at the same position as the first objects 300a to 300c. However, the aspect of the third object 700 is not limited thereto. For example, a configuration is possible in which, after the third object 700 appears, the display apparatus 100a displays the third object 700 such that the third object 700 moves so as to follow the movement trajectory of the first objects 300a to 300c, and the movement speed of the third object 700 gradually decreases.

Figure 21A:
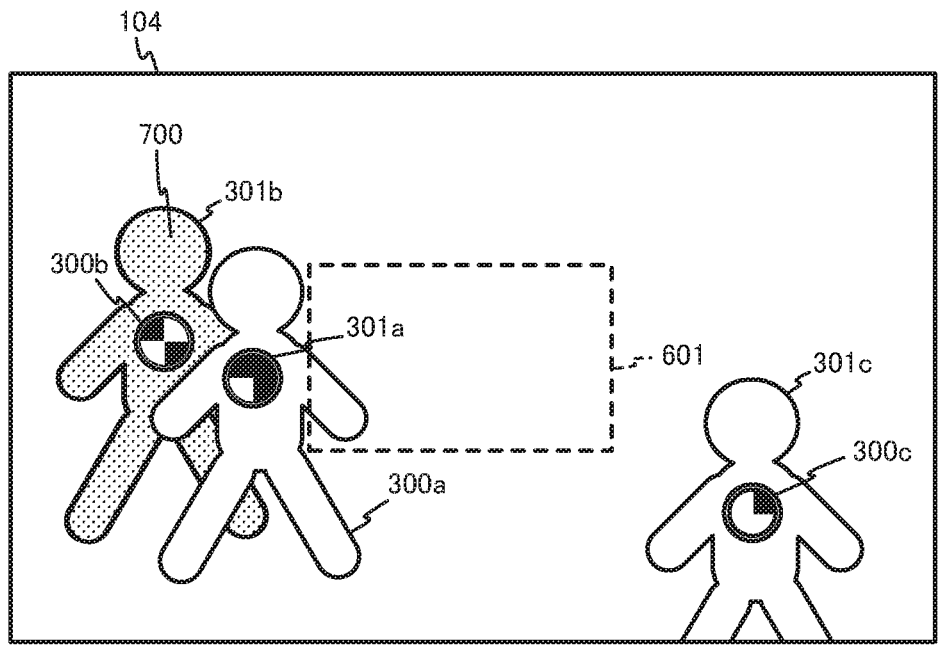
FIG. 21A is a drawing illustrating a display example of a case in which, after the third object appears, the third object follows the first object.
Figure 21B:
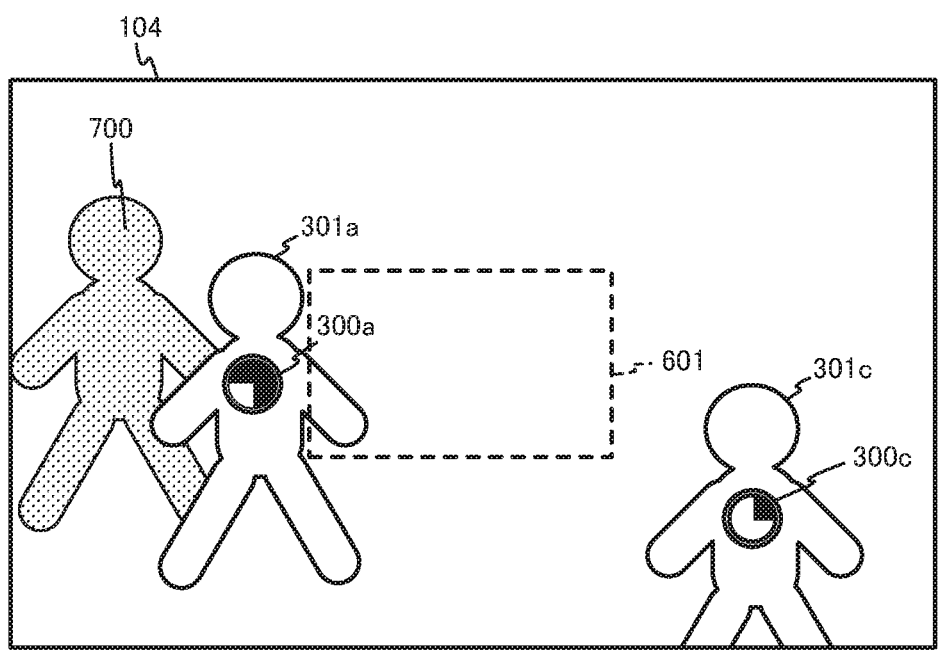
FIG. 21B is a drawing illustrating a display example of a case in which, after the third object appears, the first object leaves from the field of view of the user.

Furthermore, a configuration is possible in which, after the third object 700 appears, the display apparatus 100a displays the third object such that the third object 700 follows the first objects 300a to 300c until the first objects 300a to 300c leave the field of view of the user 202, and remains at the edge of the field of view of the user 202 when the first objects 300a to 300c leave the field of view of the user 202. For example, as illustrated in FIG. 14A, in a case in which the third object 700 appears at the position of the first object 300b, when the first object 300b moves in the leftward direction, the third object 700 is displayed so as to move and follow the first object 300b, as illustrated in FIG. 21A. Then, when it is detected that the first object 300b has left the field of view of the user 202, the third object 700 is displayed so as to remain at the left edge of the display 104. Thus, the third object 700 that is associated with the first objects 300a to 300c is displayed so as to remain in the field of view of the user 202 and, as such, the third object 700 remains in the field of view of the user 202 even when the first objects 300a to 300c of interest move and depart from the field of view of the user 202. As a result, the user 202 can easily focus on the third object 700 and the second object 500 can be displayed.

While it is clear that a display apparatus 100 or 100a that includes, in advance, the configurations for realizing the functions of the present disclosure can be provided, it is also possible to apply a program to cause an existing personal computer, information terminal device, or the like to function as the display apparatus 100 or 100a according to the present disclosure. That is, a configuration is possible in which a program for realizing the various functional components of the display apparatus 100 or 100a described in the foregoing embodiments is applied to an existing personal computer, information terminal device, or the like, thereby causing the personal computer, information terminal device, or the like to function as the display apparatus 100 or 100a according to the present disclosure. Here, the program is applied so as to be executable by the CPU or the like that controls the existing personal computer, information terminal device, or the like. Additionally, a display method according to the present disclosure can be implemented using the display apparatus 100 or 100a.

The aforementioned program is not limited to the example described above, and may be applied by any method. For example, the program may be applied by storing the program on a non-transitory computer-readable recording medium (Compact Disc Read-Only Memory (CD-ROM), Digital Versatile Disc (DVD), Magneto Optical (MO) disc, or the like), or the program may be applied by being stored in a storage device on a network and being downloaded.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can be used for a display apparatus that displays images, a display method, a program, and a non-transitory computer-readable information recording medium.

REFERENCE SIGNS LIST 100, 100a Display apparatus
101 Controller
102 ROM
103 RAM
104 Display
105 Sensor section
106 Imaging device
107 Operation device
108 Bus
111 Estimator
112 Displayer
113 Remover
114 Corrector
201 Real space
202 User
203 Display direction
300a to 300c First object
301a to 301c Observation target
400 Captured image
401, 601 Focus area
500 Second object

The invention claimed is:

1. A display apparatus comprising at least one central processing unit (CPU) configured to function as at least:
   an estimator that estimates whether an object is on a line of sight of a user;
   a displayer that displays a second object in a field of view of the user when a first object is estimated as being on the line of sight of the user continuously for a first threshold time, set for the user, or longer, the second object expressing information about the first object;
   a remover that removes the second object from the field of view of the user when the second object is estimated as not being on the line of sight of the user continuously for a second threshold time, set for the user, or longer; and
   a corrector that corrects the first threshold time, set for the user, in accordance with a length of viewing time that the second object is estimated as being on the line of sight of the user.

2. The display apparatus according to claim 1, wherein the corrector performs a correction to lengthen the first threshold time more as the length of viewing time becomes shorter.

3. The display apparatus according to claim 1, wherein the corrector corrects the first threshold time based on a distribution of the length of viewing time.

4. The display apparatus according to claim 1, wherein:
   the displayer
      removes a third object that is associated with the first object from the field of view of the user and displays the second object in the field of view of the user when the first object is estimated as being on the line of sight of the user continuously for a third threshold time, set for the user, or longer, the third threshold time being shorter than the first threshold time,
      removes the third object from the field of view of the user and displays the second object in the field of view of the user when the third object is estimated as being on the line of sight of the user continuously for the first threshold time or longer, and
      removes the third object from the line of sight of the user when the third object is estimated as not being on the line of sight of the user continuously for the first threshold time or longer.

5. The display apparatus according to claim 4, wherein the displayer displays the third object so as to appear at a same position as the first object.

6. The display apparatus according to claim 5, wherein after the third object appears, the displayer displays the third object so as to remain at a position in space in which the first object is disposed.

7. The display apparatus according to claim 5, wherein after the third object appears, the displayer displays the third object such that the third object moves so as to follow a movement trajectory of the first object, and a movement speed of the third object gradually decreases.

8. The display apparatus according to claim 5, wherein after the third object appears, the displayer displays the third object such that the third object follows the first object until the first object leaves the field of view of the user, and remains at an edge of the field of view of the user when the first object leaves the field of view of the user.

9. The display apparatus according to claim 4, wherein the third threshold time is calculated based on the first threshold time.

10. The display apparatus according to claim 4, wherein after the second object is displayed as a result of the third object being estimated as being on the line of sight of the user continuously for the first threshold time or longer, the corrector corrects the third threshold time that is set for the user, in accordance with the length of viewing time that the second object is estimated as being on the line of sight of the user.

11. The display apparatus according to claim 10, wherein the corrector performs a correction to lengthen the third threshold time more as the length of viewing time becomes shorter.

12. The display apparatus according to claim 10, wherein the corrector corrects the third threshold time based on a distribution of the length of viewing time.

13. A display method to be executed by a display apparatus, the display method comprising:
   estimating, by at least one central processing unit (CPU) of the display apparatus, whether an object is on a line of sight of a user;
   displaying, on a display of the display apparatus, a second object in a field of view of the user when a first object is estimated as being on the line of sight of the user continuously for a first threshold time, set for the user, or longer, the second object expressing information about the first object;
   removing, by the CPU, the second object from the field of view of the user when the second object is estimated as not being on the line of sight of the user continuously for a second threshold time, set for the user, or longer; and
   correcting, by the CPU, the first threshold time, set for the user, in accordance with a length of viewing time that the second object is estimated as being on the line of sight of the user.

14. A non-transitory computer-readable recording medium storing a program to function as:
   an estimator that estimates whether an object is on a line of sight of a user;

a displayer that displays a second object in a field of view of the user when a first object is estimated as being on the line of sight of the user continuously for a first threshold time, set for the user, or longer, the second object expressing information about the first object;

a remover that removes the second object from the field of view of the user when the second object is estimated as not being on the line of sight of the user continuously for a second threshold time, set for the user, or longer; and a corrector that corrects the first threshold time, set for the user, in accordance with a length of viewing time that the second object is estimated as being on the line of sight of the user.

* * * * *